Dec. 27, 1966     J. R. GALLI ET AL     3,293,852
PLASMA PROPULSION METHOD AND MEANS
Filed March 19, 1963     8 Sheets-Sheet 1
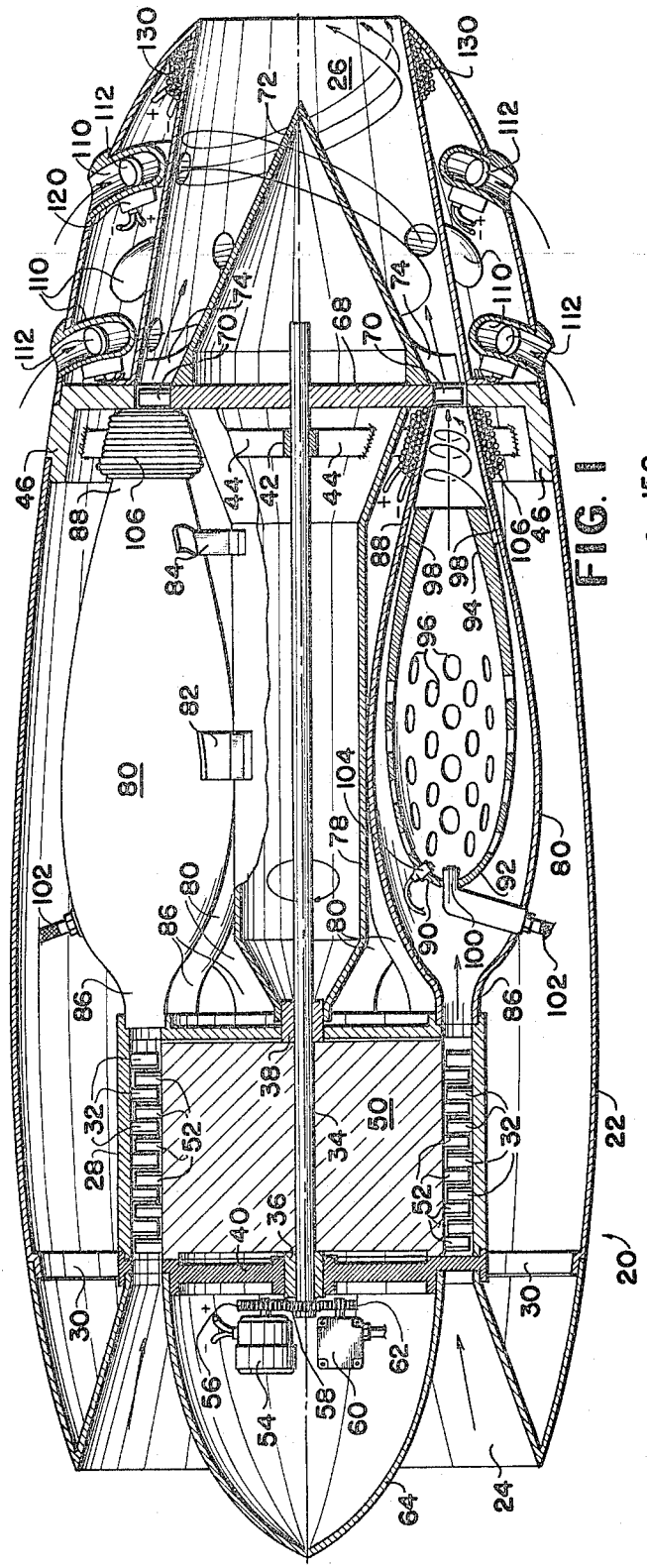
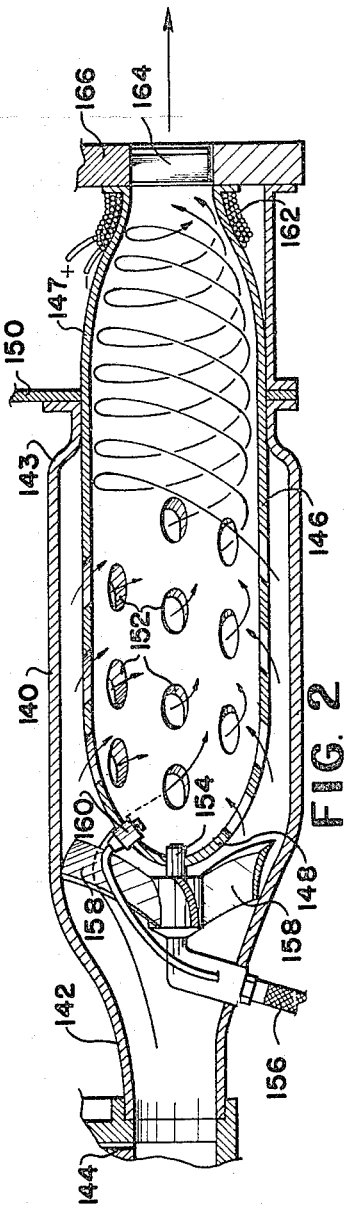
INVENTORS
GEORGE I. WHEELER
JOSEPH R. GALLI
BY
*John H. Widdowson*
ATTORNEY

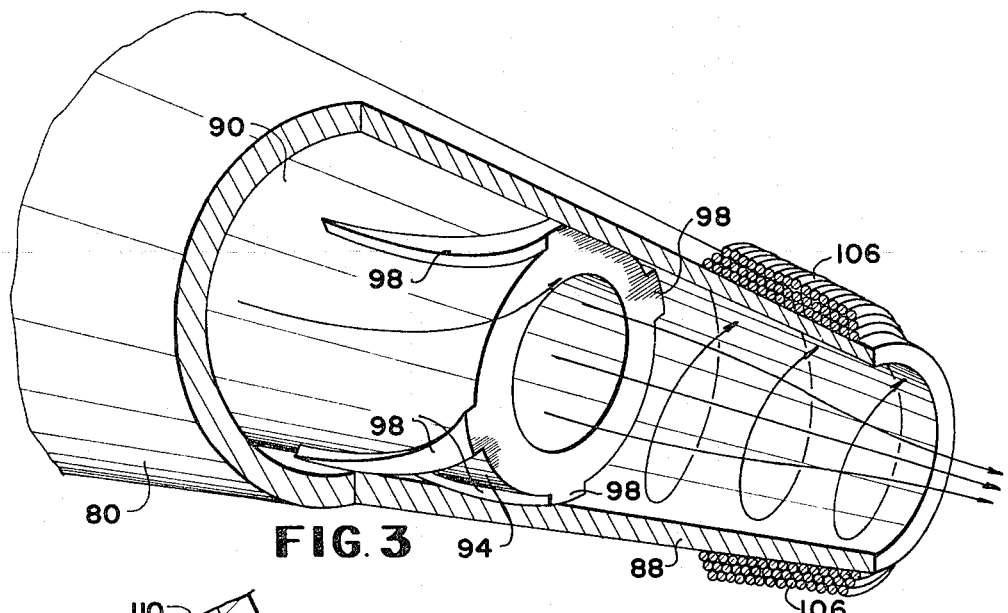
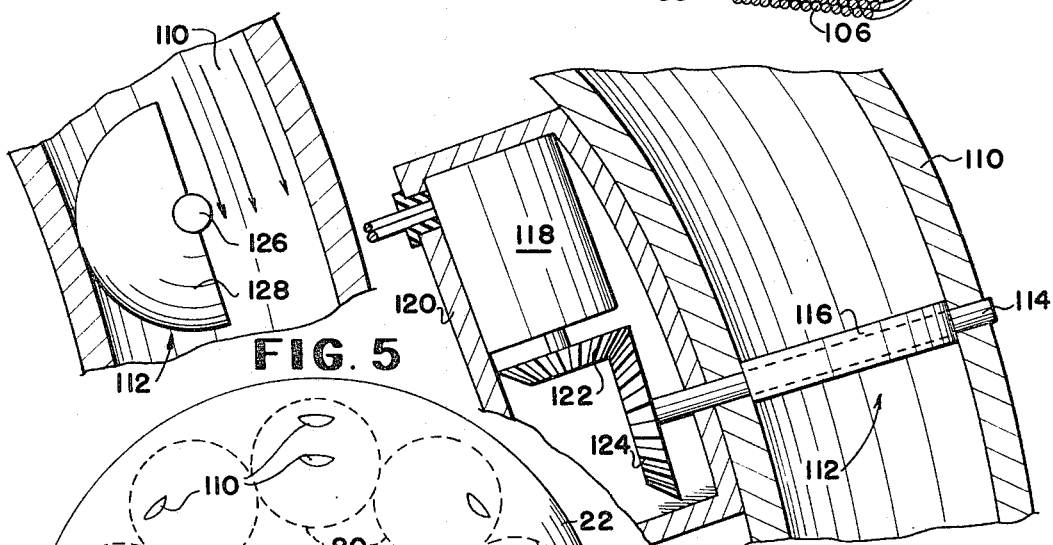
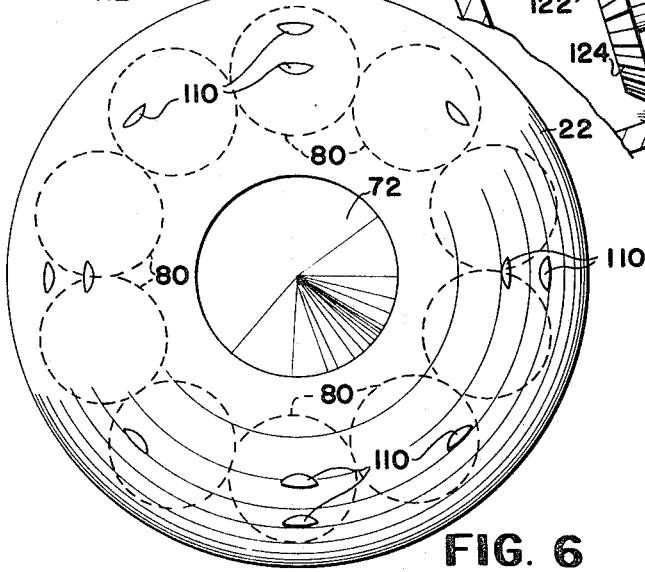

INVENTORS
GEORGE I. WHEELER
BY JOSEPH R. GALLI

John H. Widdowson
ATTORNEY

Dec. 27, 1966   J. R. GALLI ET AL   3,293,852
PLASMA PROPULSION METHOD AND MEANS
Filed March 19, 1963   8 Sheets-Sheet 5
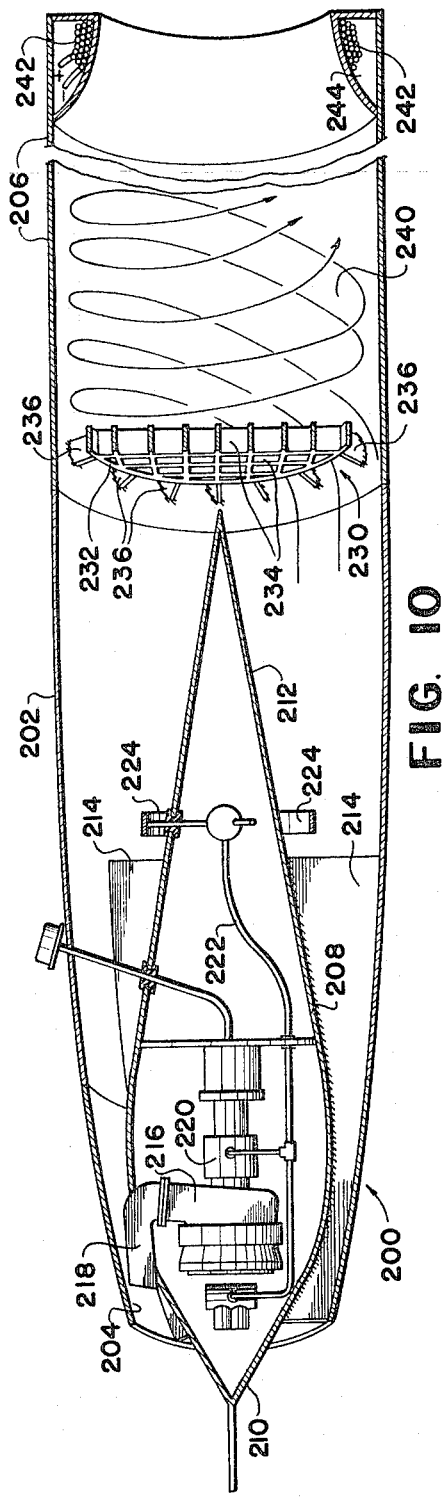
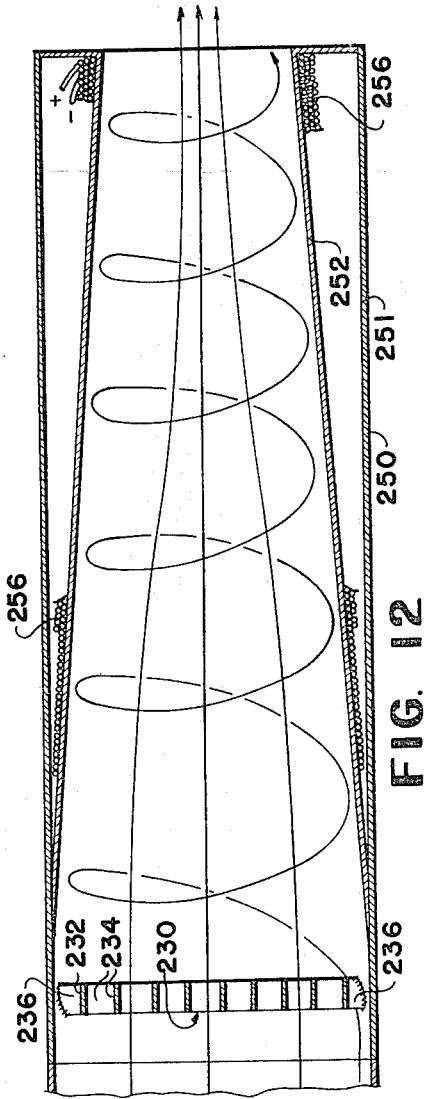
INVENTORS
GEORGE I. WHEELER
BY JOSEPH R. GALLI
ATTORNEY

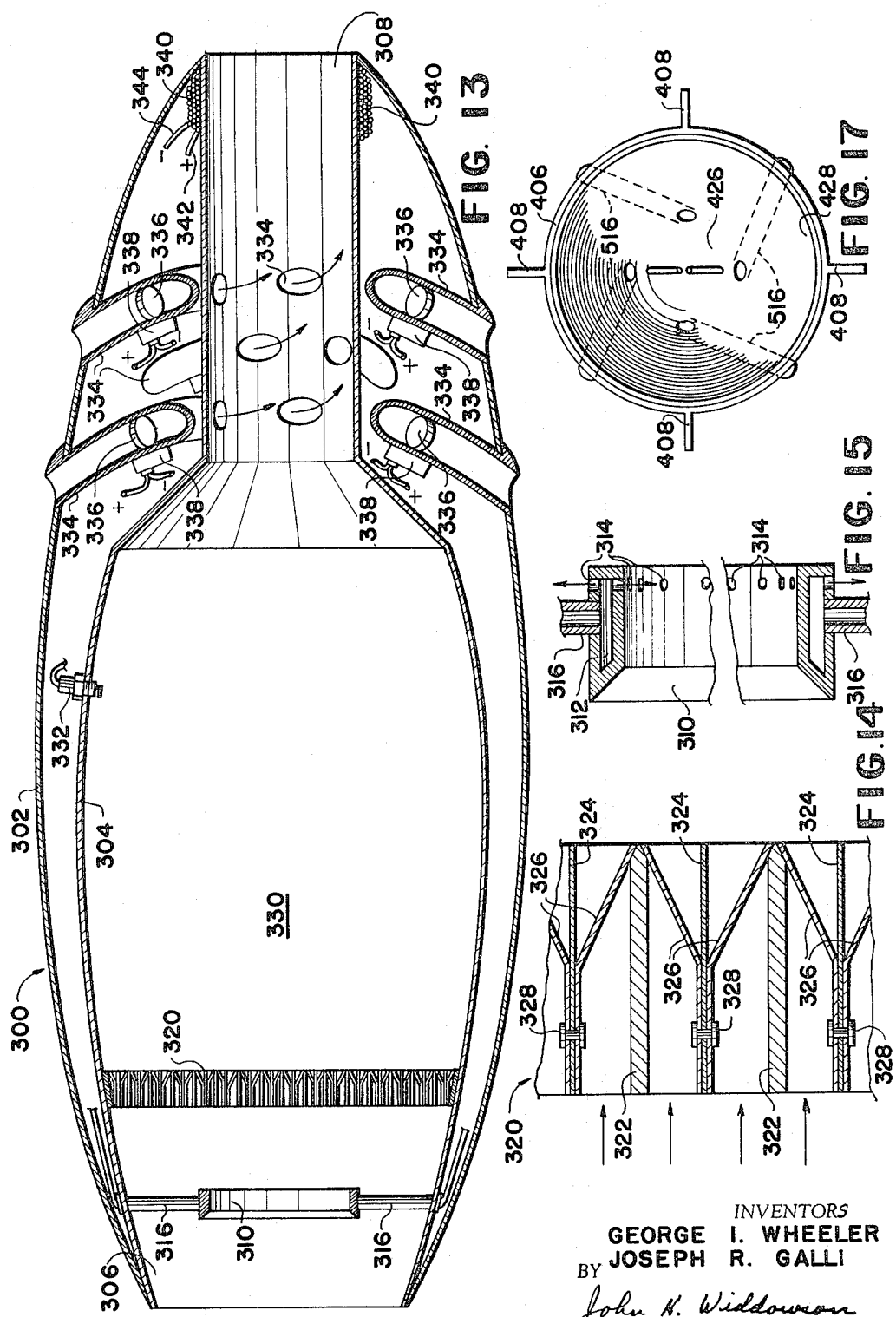

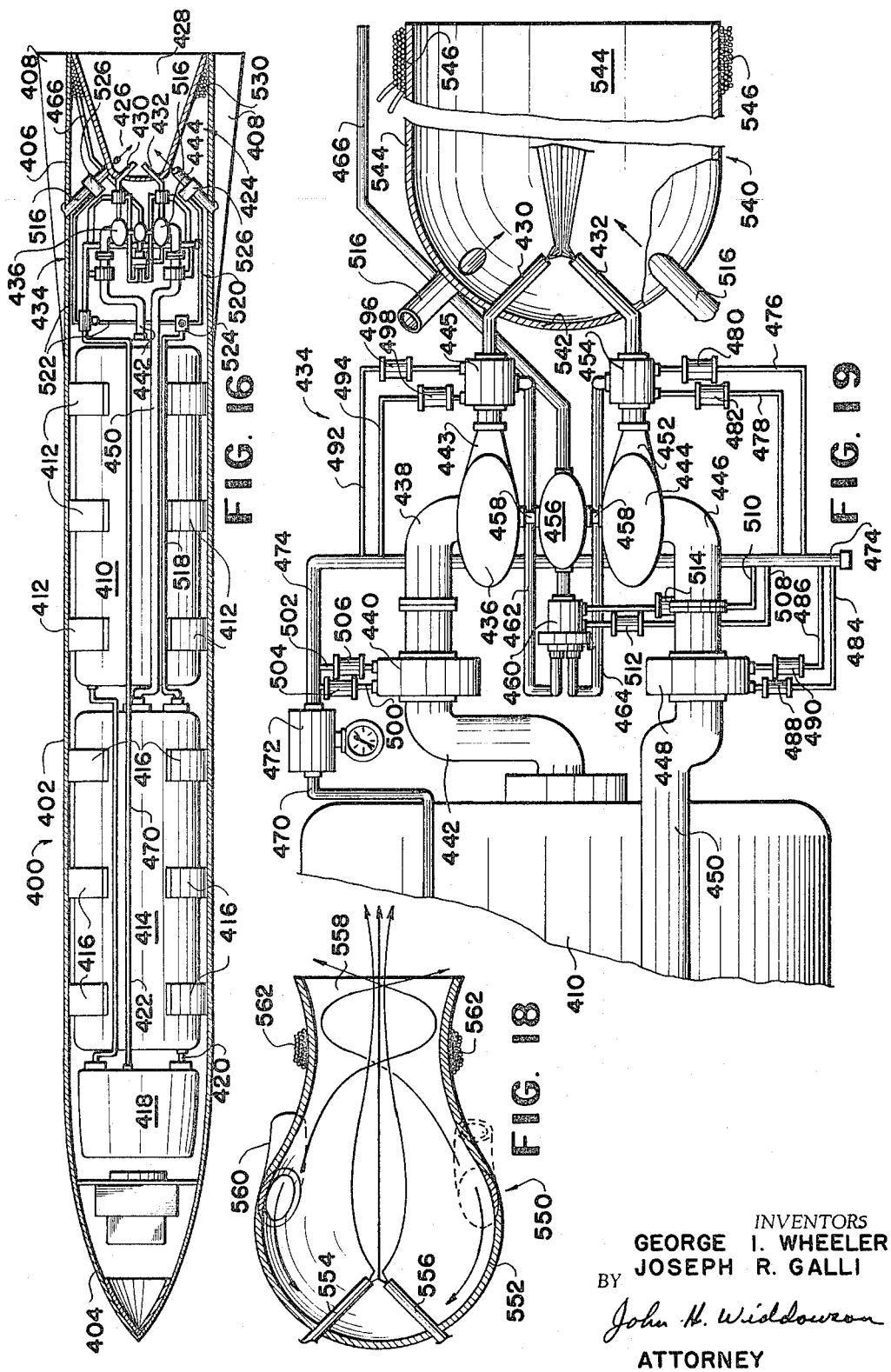

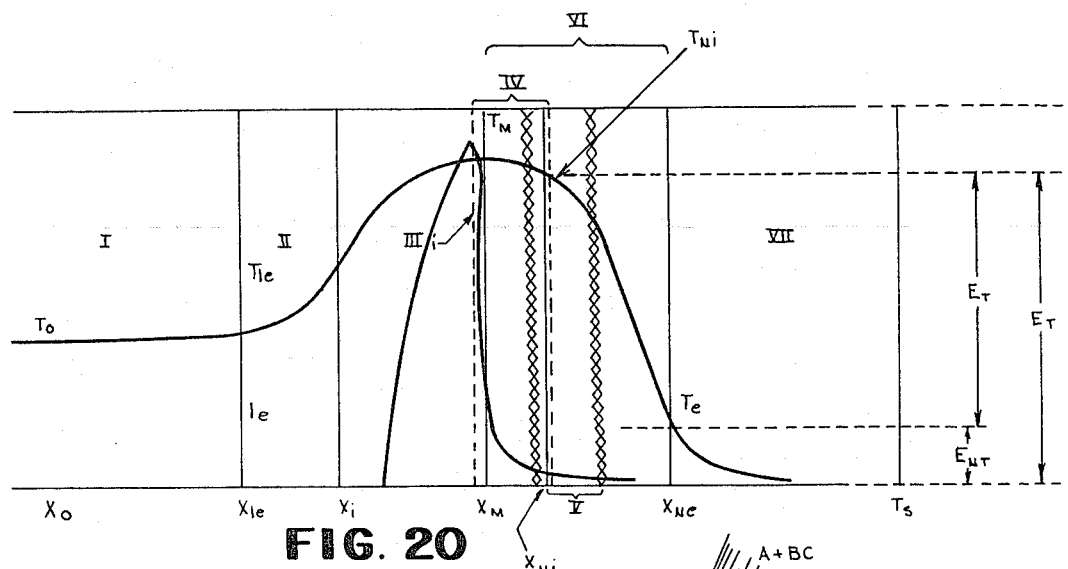
FIG. 20
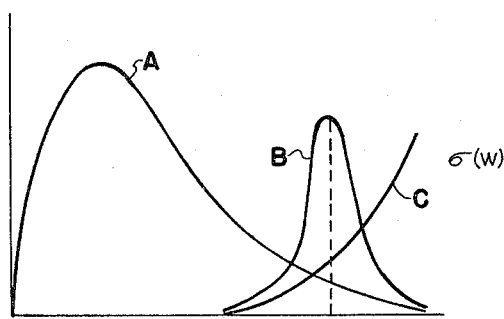
FIG. 21
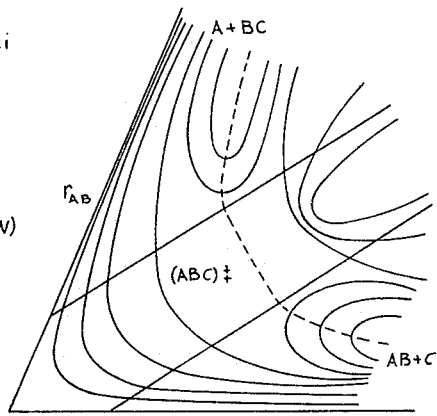
FIG. 22
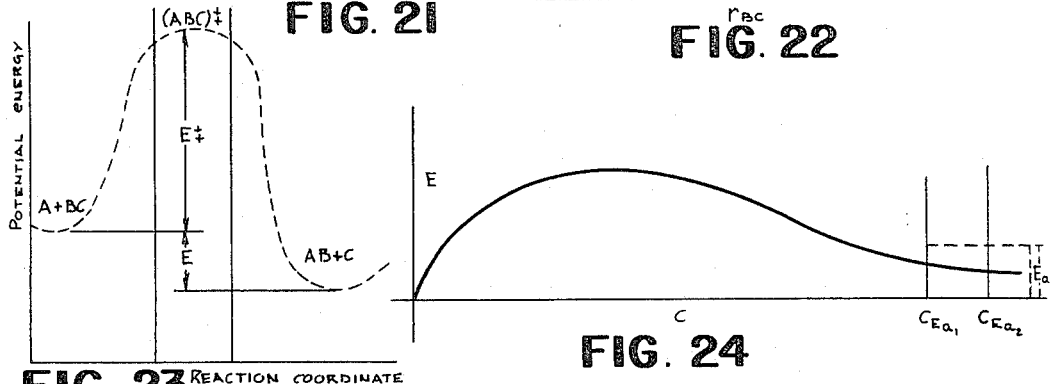
FIG. 23
FIG. 24
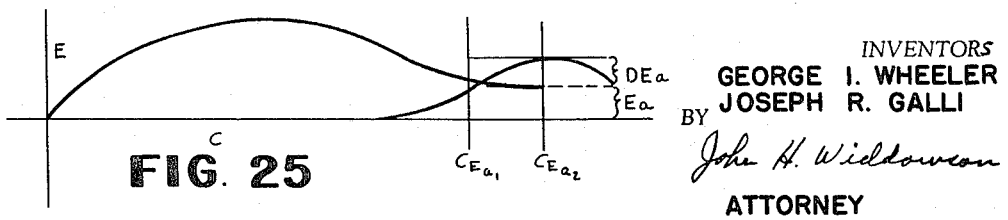
FIG. 25
INVENTORS
GEORGE I. WHEELER
JOSEPH R. GALLI
BY
John H. Widdowson
ATTORNEY 2 3,293,852
PLASMA PROPULSION METHOD AND MEANS
Joseph R. Galli and George I. Wheeler, Wichita, Kans., assignors to The Boeing Company, Wichita, Kans.
Filed Mar. 19, 1963, Ser. No. 266,263
29 Claims. (Cl. 60—202)

This application is a continuation-in-part of our application titled Hydrocarbon Combustion Generated Plasma Jet Engine, Serial No. 717,653, filed February 26, 1958, now abandoned.

This invention relates to propulsion method and means, and especially to hydrocarbon combustion generated plasma propulsion method and means. In a more specific aspect, the invention relates to propulsion method and means wherein a propulsion force is provided by a plasma stream or fluid generated in engine means to result in a thrust on the engine means. In a still more specific aspect, the invention relates to new propulsion method and means wherein a combustible fuel is mixed with an oxidizer and is ignited in a combustion chamber with the resulting combustion products being directed therefrom and constricted or pinched to result in an increase in the temperature and velocity of the combustion products and an increase in the thrust produced. Still more specifically, the invention relates to new method and means for producing thrust wherein a combustible fuel is burned in a combustion chamber and acted upon in a manner to cause a thermal pinch or constriction of the resulting combustion products or gases with these combustion products or gases then being passed through magnetic means which further act upon the combustion products or gases in a manner to result in a further constriction of the combustion products or gases and an increase in the temperature and velocity of the combustion products to result in an increase in thrust produced.

Various types of propulsion method and means are known to the art and include turbo jet engines, turboprop jet engines, ramjet engines, pulsejet engines, rocket engines, etc. Attempts have been made in the art to increase the efficiency and/or thrust obtainable from an engine by the use of special types of fuel, afterburners by the use of nuclear engines and other types of propulsion means, such as ion or proton propulsion means, and it has generally been felt that the efficiency of many propulsion means have reached or are approaching the maximum that can be obtained. The use of exotic fuels and the like in order to increase output or performance of the engine means creates special problems in the engines, require special handling of the fuel and are frequently costly. In addition, where high temperatures are involved consideration must be given to the ability of the containing structure to withstand the temperatures generated and this limitation alone has impeded development in certain instances.

In accordance with the present invention new plasma propulsion method and means have been provided. The propulsion means of this invention includes a housing which has an outlet and means defining a combustion chamber within the housing and in fluid communication with the outlet. Fuel supply means are operatively connected to the combustion chamber to supply fuel thereto for combustion therein. The propulsion means of our invention in a preferred specific embodiment has means positioned relative the combustion chamber and the exhaust portion of the housing to provide a fluid to the propulsion means and direct same onto combustion gases from the combustion chamber to constrict the combustion gases.

In another preferred specific embodiment of our invention magnetic means are mounted relative the housing of the propulsion means and are positioned to provide a magnetic field around the combustion gases resulting from combustion of the fuel in the combustion chamber and leaving the chamber to constrict the combustion gases.

In a preferred specific embodiment of the propulsion means of our invention, the means to constrict the combustion gases by directing a fluid onto same and the magnetic means to provide a magnetic field around the combustion gases to constrict same are used together, preferably with the magnetic means being operable to provide the magnetic field to constrict the combustion gases after constriction has occurred from fluid action on the combustion gases. The propulsion means is constructed and adapted to pass a fluid to the housing with fuel being provided to the combustion chamber for combustion therein with the resulting exhaust gases passing out of said combustion chamber downstream of the combustion chamber and constricted by the fluid with the magnetic field around the exhaust gas stream causing the ionized particles in the exhaust gases to further move inwardly and be constricted, the constrictions resulting in an increase in temperature and velocity of the gases.

In practicing the method of the invention, a fuel and an oxidizer is provided to a combustion chamber and the fuel is burned in the chamber. The resulting combustion products are constricted with a fluid and/or are constricted by passing the combustion products through a magnetic field. The resulting constricted combustion products are then discharged to the atmosphere to provide thrust. In a preferred specific method of our invention, both fluid constriction and further magnetic field constriction are practiced.

Accordingly, it is an object of the invention to provide new propulsion method and means.

Another object of the invention is to provide new propulsion method and means wherein a stream of combustion gases or products is constricted or pinched to result in an increase in the velocity of the stream with a resulting increase in thrust obtained.

A further object of the invention is to provide new propulsion method and means wherein combustion takes place in a combustion chamber and the resulting exhaust gases are discharged through a nozzle or outlet end of the engine means and wherein means are provided to constrict or compress the exhaust gases by a fluid.

A further object of the invention is to provide new propulsion method and means wherein combustion takes place in a combustion chamber and the resulting exhaust gases are discharged through a nozzle or outlet end of the engine means and wherein means are provided to constrict or compress the exhaust gases by providing a magnetic field around the exhaust gases.

Still a further object of the invention is to provide new propulsion method and means wherein combustion takes place in a combustion chamber and the resulting exhaust gases are discharged through a nozzle or outlet end of the engine means and wherein means are provided to constrict or compress the exhaust gases by fluid and wherein additional constriction or compression of the exhaust gases is obtained by a magnetohydrodynamic pinch.

A further object of the invention is to provide new method and means for producing thrust wherein high temperatures can be obtained and/or used without adversely affecting the containing walls.

A further object of the invention is to provide new propulsion method and means wherein random direction of particle movement normally occurring in combustion gases is substantially reduced or eliminated and particle movements are collimated to act more nearly parallel to the engine axis.

Another object of the invention is to provide new propulsion method and means wherein fields of an ionized gaseous stream are utilized to provide an increase in velocity of the stream.

A further object of the invention is to provide a new method for increasing the thrust produced by an engine consuming a hydrocarbon material wherein a plasma stream is created and subsequently pinched or constricted to result in an increase in the temperature and velocity of the stream.

Various other objects, advantages and features of the invention will become apparent to those skilled in the art from the following discussion taken in conjunction with the accompanying drawings, in which:

FIG. 1 is a longitudinal cross sectional view of a preferred specific embodiment of a turbojet engine constructed in accordance with the invention.

FIG. 2 is a longitudinal cross sectional view through a combustion chamber of a modified form of a turbojet engine.

FIG. 3 is an enlarged partial isometric view, partially cut away, showing the downstream end portion of the air conduit and combustion chamber of the embodiment of the invention shown in FIG. 1.

FIG. 4 is an enlarged partial cross section view of the engine of FIG. 1 showing a preferred means for regulating flow of air through the air tubes.

FIG. 5 is an enlarged view showing another construction for regulating passage of fluid through the air passage or tubes.

FIG. 6 is a view from the downstream or rear end portion of the engine of FIG. 1.

FIG. 10 is a longitudinal cross section view of a preferred specific embodiment of a ramjet engine of the invention.

FIG. 12 is an enlarged partial longitudinal cross sectional view of a modified form of construction of a ramjet engine of the invention.

FIG. 13 is a longitudinal cross section view through a preferred specific embodiment of a pulse jet engine of the invention.

FIG. 14 is an enlarged partial cross section view through the valve bank of the engine of FIG. 13.

FIG. 15 is an enlarged view illustrating the construction of the fuel manifold of the engine of FIG. 13.

FIG. 16 is a view of a preferred specific embodiment of a rocket of the invention having the outer housing cut away to illustrate the position of the various parts therein.

FIG. 17 is a view from the rear or nozzle portion of the rocket engine of FIG. 16.

FIG. 18 is a cross section view through a modified rocket engine construction usable with the rocket of FIG. 16.

FIG. 19 is an enlarged view showing a preferred specific embodiment of the means for providing fuel and oxidizer to the rocket engine in the system of FIG. 16 and additionally illustrating a modified engine construction.

FIG. 20 is a diagram plotting temperature against distance along a combustion wave.

FIG. 21 is a diagram illustrating the effect of energy distribution on reaction rate.

FIG. 22 illustrates the potential energy surface for the reaction of A with BC.

FIG. 23 illustrates the potential energy as a function of the distance along the reaction coordinate.

FIGS. 24 and 25 are diagrams of energy against particle concentrations.

Figure 7:
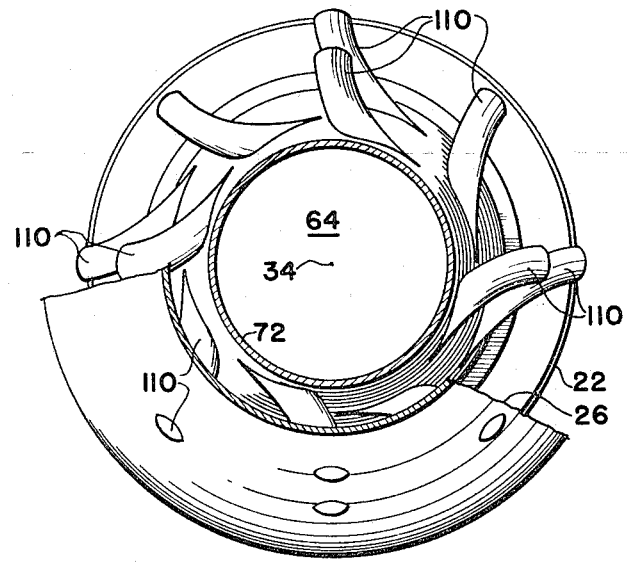
FIG. 7 is an end view, partially broken away, of an engine of FIG. 1 showing a preferred shape and arrangement of the air tubes therein.

The following is a discussion and description of preferred specific embodiments of the methods and means of the invention, such being made with reference to the drawings whereon the same reference numerals are used to indicate the same or similar parts. It is to be understood that the discussion and description are not to unduly limit the scope of our invention.

Much of the phenomena which occurs in combustion can be represented by FIG. 20 which plots temperature against distance along a combustion wave, and the consideration for the practice of our invention is the effect of a magnetic field thereon. The $T_o$–$T_s$ curve is a mathematical representation of the final result of the interaction which has occurred and is occurring at the point considered between the combustion wave and a flowing combustible mass of gas. Since in practicing our invention, our interest in modifying this interaction in the direction of enhanced thrust the curve is interpreted in greater detail. For practicing our invention the interest is qualitative and we have assumed the following generalizations:

(1) The presence of mass flow in the combustion gas implies the existance of a deviation between the average molecular velocity between a specific volume within the flow and a precisely equivalent volume outside the flow and between adjacent volumes within the flow.

(2) Considering any element of fluid flow, there exists between the element considered and the element immediately adjacent downstream a positive deviation in average molecular velocity. In this regard an element of fluid flow is a volume of gas which is small in comparison to the macroscopic variable but sufficiently large to be describable by continuum mathematics. The volume of the element is equal to the cross sectional area of the region within which the flow exists times a thickness determined by the criterion that continuum mathematics must apply.

(3) As a result of this deviation there exists between immediately adjacent fluid elements in the combustion stream net flow of molecular momentum across the mathematical interface between the two volumes considered and in the direction which tends to reduce the deviation in average molecular velocity.

(4) The distribution of molecular velocities in any fluid element is determined by and hence the average molecular velocity is dependent upon the thermodynamic temperature of the gas within that element. The difference in temperature between two elements can therefor be regarded as the determining factor in the production and control of mass flow. It does so by the production of a potential field between elements in the flow of differing temperature within which a force acts upon the particles of the gas in proportion to their mass. The intensity of the magnetic field and therefor the magnitude of the force acting upon the particles in the combustion stream is directly proportional to magnitude of the difference of temperature between adjacent elements. The force resulting from the temperature gradient spread over the interface separating the elements is a measure of the static pressure at any point on the interface. Macroscopic flow in a gas is therefor conversion of microscopic motion of the gas particles into mass flow. The rate of flow at any point is determined by thermodynamic variables of the flow, the temperature, pressure, and density which are related to the microscopic variables, the particle velocity and mass (a function of molecular weight) as indicated above.

The foregoing generalizations apply only to mass flow in the combustion gas stream in the absence of energy addition, the combustion wave however, we have found, does result in addition of energy in a particular manner to the flow. It is desirable in practicing our invention to consider in all cases energy addition to the combustion gases, specifically the desired manner in which the chemical energy of the fuel is coupled to the flow.

When a source of energy is coupled to the combustion gas a total quantity of energy is added to the material per unit time depending upon the flux intensity of the energy source, the efficiency of coupling between the source and the material, and upon the volume of gas in immediate contact with the source of energy. In the practice of our invention, the volume of contact is relatively small and the energy is transferred immediately to those particles in the volume of contact and dispersed throughout the remainder of the combustion gas by collisions in a manner analogous to that by which energy in an electrical discharge is abstracted from the electric field by the electrons and thence transferred to the gas particles in the discharge. At any instant a certain quantity of energy will have been transferred to a volume of combustion gas in the immediate vicinity of the point of contact between the source and the gas proportional to the difference between the rate of energy addition to the gas and the rate of energy loss and to the rate at which the collision frequency under the existant conditions permits the dispersal of energy throughout the gas. This energy is partitioned between the various degrees of freedom within the combustion gas including translation, rotation, vibration, dissociation, ionization. Except at relatively high temperatures the majority of the energy resides in the translational mode since this is the only mode which does not require collisions and because the remaining modes all have relatively high excitation energies. That portion of the total energy residing in the translational mode is distributed among the particles within the volume of combustion gas actually sensibly heated within the engine time period considered so as to give distribution molecular velocities such as that shown at A in FIG. 21. The fractional part of the total energy residing in the modes other than translational depends upon the concentration of particles possessing translational energy sufficient to transfer the amount of energy necessary to excite the other modes. Since only particles in the high energy tail of the distribution possess this amount of energy and since energy transfer can occur only at a rate determined by the collision frequency, at any given instant the translational mode outweighs the other modes unless the total energy within the volume considered is increased or the concentration of particles in higher energies is perturbed as for instance by the injection into the volume of particles of a specific energy in excess of the average.

We have found that mass flow in the engine combustion gas is related to the difference in temperature between adjacent elements of flow and that this in turn is related to differences in molecular velocities between the elements considered. We have further found that the distribution of velocities depends upon the total energy added to the combustion gas per unit time over the volume through which the energy is dispersed in the time of heating. Since the dispersal of energy throughout the volume of gas depends upon collisions, for the purpose of design in practicing our invention, we designate a "residual energy" determined by the total amount of energy added to the combustion gas in the mean free time of the particles within the volume of contact between the gas and source minus the total energy loss by all means within this period. The volume of contact we define for design purposes, as equal to the cross sectional area over which the combustion gas is in actual contact with the source times the linear distance through which the added energy is dispersed in one mean free time. We further define a "power density ratio" as ratio between the total energy added in one mean free time to the total energy lost in the same period. The behavior of the combustion gas is then determined by the residual energy at the point considered and this in turn is determined by the power density ratio at that point.

We have found that the only source of energy in a combustion wave is the chemical energy of the fuel which is added to that already present and responsible for the flow prior to any combustion. In order to evaluate the effect of the combustion wave on the flow in light of the concepts of our design consideration of residual energy and power density ratio, we consider and examine the factor which determines the total energy available from chemical reactions and the rate at which the energy is released. The total energy available from chemical reactions is equal to the product of the reaction rate times the energy released per reaction. Of these, the total energy released per reaction is determined from the route of reaction for the particular fuel considered. However, the chemistry of the reaction is not known in all cases. Whatever this energy, however, the physics of the situation is similar and can be evaluated. We assume therefor a particular total energy release Q per reaction and proceed to consider the factors which affect the reaction rate. Reaction rates of chemical reactions are for the purpose of practicing our invention, considered in terms analogous to those associated with thermonuclear reaction rates, since both types are associative, that is, they occur only between particles in a particular energy state. In taking such an approach we have found it necessary to consider the differences between the two types of reaction other than the very great difference in the level of energy necessary to induce thermonuclear reactions the total energy released per reaction. Of the two, combustion reactions are much the more complex due to the fact that in thermonuclear reactions one deals with stripped nuclei and the potential barrier which must be overcome is simply the coulomb force between similarly charged particles and can therefor be considered classically whereas the bound electrons in chemical reactants introduce quantum mechanical effects which must be considered.

The physical situation in either case is shown in the diagram of FIGURE 21. The curve A is a plot of the rate of change of concentration of particles possessing a particular energy versus energy. The curve B represents the rate of change of the reaction cross section per unit change of energy and the curve C is the curve obtained by multiplying the ordinates of curve A and B. We are concerned in practicing our invention with the concentration of particles whose energies lie somewhere on curve A between $E_A$ and $E_a$ and $dE_A$ where $E_a$ is the activation energy for the reaction of interest. The cross section for the reaction as a function of energy is shown as curve B and can be calculated directly from kinetic theory considerations for fusion reactions and for chemical reactions if one considers only the collisions rate theory. This theory gives a chemical reaction rate much higher than we can experimentally verify. It is with regard to the reaction cross section that the complications associated with chemical reactions as compared to fusion reactions enter in considerations of practicing our invention. We have been able to eliminate a part of these design difficulties through considering the absolute reaction rate theory of Polanyi and Eyring. Considering FIGURE 21, and considering that the reactions considered involve two different types of particles, the total reaction rate is given by the area under the curve C and that of only those few particles only a relatively few particles in the high energy tail of the distribution curve actually contribute to the reaction rate. For such reactions, we have found that the reaction rate can be expressed (1) $$R = n_1 n_2 \overline{\sigma v}$$

where:

$R$ = the reaction rate $n_1, n_2$ = concentration of interacting particles $\overline{\sigma v}$ = the product of the average reaction cross section and the average velocity of the particles capable of reacting.

the power per unit volume is then (2) $$P = n_1 n_2 \overline{\sigma v Q}$$

where $Q$ = energy released per reaction.

For the purpose of practicing our invention, from consideration of cross sections for combustion reactions, it has been established that combustion reactions result from the interaction between free radicals, formed as a result of the high residual energy in the combustion gas reaction zone, with other particles in the combustion flow. The reaction rate in any region depends upon the concentration of free radicals in the region which is always considerably less than the concentration of any other particles with which the free radicals can react. In order for the reaction to take place, we have found it desirable for the particles involved to interact, and they interact in a particular fashion. The result is the formation of a metastable complex called in the absolute rate theory an activated complex which being unstable rapidly decomposes to yield the products of combustion.

Such a reaction can be expressed by an equation (3)     A and B→M→reaction products.

In order for the activated complex to be formed, the particles as we have found must overcome the potential barrier between them. Because of the quantum mechanical effects of the bound electrons on the free radical and the particle with which it interacts can be represented by a diagram such as that shown in FIGURE 22. The island in the upper left designated $(A+BC)$ represents the reactants whereas that in the lower right designated $AB+C$ represents the reaction products. The region in the middle A B C represents the activated complex. The dotted line connecting the two regions represents the so-called reaction coordinate and indicates the path of interaction. A cross section of the potential energy diagram gives the curve of FIGURE 23 which is a diagram of a reaction representing the change in energy (E) in going from the reactants to the products of a chemical reaction and $E\ddagger$ is the activation energy. The rate of reaction in the combustion gas is determined by the concentration of the activated complexes at the peak of the potential barrier and the number which pass over per unit time. Thus:

(4)     $R = (C\ddagger v)/w\ddagger$ where:

$C\ddagger$ = concentration of activated complex
$v$ = velocity of crossing
$w\ddagger$ = width of the peak We have found the concentration of activated complexes depends upon the number of particles in the distribution of velocities possessing energy necessary for the production of free radicals (i.e. the activation of energy for combustion reaction is just that necessary to produce free radicals) whereas the remainder of the variables are more or less constant for a given reaction as is the dissymmetry of the electron cloud surrounding the free radical which permits sticking reactions only along a specific coordinate.

Again considering Equation 2

$$P = n_1 n_2 \overline{\sigma v} Q$$

We can replace $n_1 n_2$ with $c\ddagger$ the concentration of activated complexes and incorporate in FIGURE 23 the factors which we have set forth hereinbefore as determining the reaction rate and note that $Q = E$ in FIGURE 23. The total power released by chemical reactions per unit volume per unit time can be controlled if the concentration of particles with energy in excess of E, the activation energy of the reaction involved is regulated, and it is preferable, if this is accomplished without increasing the average velocity of the particles in the region considered.

Interpreting the $T_o - T_s$ curve of FIGURE 20 on the basis of the foregoing discussion, for the purpose of practicing our invention, we have found it possible to divide the combustion wave into three basic regions, the first extending from the point $x_o$ where the gas enters the combustion region at a temperature $T_o$ to the point $X_{le}$ which represents the beginning of the reaction zone, the second consisting of the reaction zone, and the third extending from the point at which the reaction is complete to the point of $x_{ne}$, the nozzle exit. We have found that the region between $x_{ne}$ and the point at which the exhaust attains equilibrium with the surrounding gas has little significance as far as thrust is concerned, since all of the energy available for thrust is extracted from the flow by expansion through the nozzle at $x_{ne}$.

The point $x_{le}$ where a specific element of fluid flow attains a temperature just measurably different from $T_o$ we consider for design as the leading edge of the combustion wave. From this point onward throughout Region I we have found the temperature within the element gradually increases as a result of the physical processes which transfer energy from hotter regions downstream and increasingly by exothermic reactions at a rate determined by the residual energy in the combustion gas at the point considered. The residual energy in the fluid element is determined by a total energy equal to the sum of that transferred by physical processes plus that released within the element at a rate determined by the concentration of particles in the velocity distribution established by the local temperature. The local temperature is in turn determined by the total energy available to the gas and by the degree of equilibration between the various energy modes available under the conditions existant at the point considered. If the ratio of the rate of sensible heating of the gas to the rate of dissipation of energy throughout the gas (i.e. the power density ratio) is equal to or less than 1, then equilibrium conditions will prevail and equilibrium between all modes is attained. We have found, however, that if this ratio exceeds 1, a greater portion of the added energy is concentrated in the translational mode, and the greater the excess the greater the deviation from equilibration between the translational mode and the other modes. We have found the deviation occurs because of the greater efficiency of energy transfer to the translational mode than to other modes. The point at which the power density equals 1 is the point at which the rate of energy transfer from the external source is just equal to the rate of energy transfer by collisions.

In the combustion wave in the combustion gas the total energy at any point is equal to the sum of the energy which has been physically transferred to the gas from the hotter regions downstream plus the energy released by chemical reactions which have occurred and are occurring in an element of the combustion gas at the point considered. This energy (i.e. the residual energy) is proportioned among the particles within the element and there exists a certain particular distribution of molecular velocities such as shown in FIG. 24. Within such a distribution there exists a certain concentration of particles (those between $C_{E_{a1}}$ and $C_{E_{a2}}$ possessing kinetic energy in excess of the activation energy of the fuel combusted. A maximum is included in the diagram because we have found the collision cross section of particles is a function of energy, and particles whose kinetic energy is much in excess of the interparticle attractive energy have a lower collision cross section in proportion to the amount of such excess. A certain small fraction of these collide with oncoming fuel particles in such a way as to form free radicals. If the concentration of the particles in the region $C_{E_{a1}}$ and $C_{E_{a2}}$ were the only source of high energy particles, then the residual energy of the combustion gas in the element considered would be the major factor determining reaction rate in the element considered. However, as we have found the major portion of activation energy and the heat of combustion appears as kinetic energy in product molecules. The concentration of these high energy particles is dependent upon the reaction rate in the element in which they are produced so that the concentration is greater in the higher temperature regions (I and II), so that a concentration gradient exists with respect to these particles between a high temperature element and the lower temperature element immediately adjacent upstream. There is we have found, a net flux of high energy particles upstream which modifies the velocity distribution and hence the reaction rate as shown in FIG. 25 without significantly changing the average velocity (i.e. the local temperature). The local reaction rate is, however, modified in proportion to the increase in concentration resulting from the diffusion into the region of particles with sufficient energy to produce free radicals. The reaction rate upstream is also modified by the upstream diffusion of free radicals which diffuse into the lower temperature regions for much the same reason, however, their concentration is almost always less, we have found. At some point on the combustion wave between $x_{1e}$ and $x_1$ the relative contribution of chemical processes to a given element of flow just exceeds that contributed by physical heat transfer. At the point $x_1$, the concentration of high energy particles is just sufficient to produce one free radical for each one consumed, lost by diffusion or noneffective collisions. At this point the combustion produces energy at a rate just sufficient to sustain itself in the absence of external energy sources. Subsequent to the point $x_1$ the local temperature rises rapidly to and levels off at $T_m$ the maximum combustion gas flame temperature. Within a region of the order of some small fraction of a millimeter the major portion of the combustible material is consumed. We have found that the phenomena which occur in this small region determines the overall behavior of the combustion wave acting as it does as the principal source of additional energy in the combustion wave and of the superthermal particles which perturb the distribution of molecular velocity in the upstream elements and hence controls the reaction rates over the entire region from at least $x_1$ forward. In addition, since the major portion of the total energy available from combustion is added to the combustion gas in this region the amount of thrust available from the particular fuel and combustion geometry considered is determined in this region. In the region from $x_m$ to $x_{n1}$ the gas relaxes to a certain extent from maximum energy attained within the reaction zone. At the point $x_1$ a certain particular partition of energy between the various energy modes exists depending upon the deviation from equilibrium attained in the combustion region and the total time the combustion gas is permitted to relax between $x_m$ and $x_{n1}$. That portion of the total energy existent in the translational mode at the point $x_{n1}$ is available for thrust whereas that in the other modes remains frozen in the flow subsequent to $x_{ne}$ unless some provision is made in the nozzle, or unless the nozzle is long enough, to permit relaxation of the higher modes. Normally we have found such mechanisms do not exist and the energy frozen in the flow appears as radiation or sensible heating of adjacent material parts.

Any potential modification in the combustion flow, if possible, is usually attained by some modification of the phenomena occurring in the combustion region.

In considering such modification we have discussed the following relationships:

(1) The amount of energy at the nozzle inlet available for thrust is dependent upon the concentration of the total energy in the translational mode at the nozzle inlet.

(2) The amount of energy in the translational mode depends upon the power density ratio. The greater this ratio exceeds 1 the greater the proportional amount of the residual energy in the gas residing the translational mode.

(3) The power density ratio depends upon the total energy available from combustion of fuel in the reaction region and upon the reaction rate in this region, and upon the collision frequency which determines the rate of dispersal of energy in the combustion gas. The former is a rapidly increasing function of energy whereas latter increases more slowly and in fact peaks in energy and thereafter decreases. Above this certain energy therefor, we have found the deviation from equiportions also increases rapidly with increasing power density ratio.

(4) The reaction rate is a closely coupled function to free radical concentration and concentration of particles in the velocity distribution with energy in excess of the activation energy of the fuel. Any modification which tends to increase or decrease one tends to affect the other similarly.

Therefore, we have determined that any process which tends to increase the free radical concentration, or increase the concentration of particles of precisely the proper energy to produce free radicals tends to increase the reaction the outward pressure of the combustion zone, and magnet- total amount of energy available for thrust.

Since concentration is equal to total number per unit volume, an increase can be attained either by increasing the total number of particles or by compressing the volume within which the particles are confined.

We had discovered means for decreasing the volume radially, including the utilization of vortex confinement such that the radial inward force of the vortex exceeds the outward pressure of the combustion zone, and magnetic pressure resulting from the interaction between external magnetic fields and ionization associated with combustion, particularly hydrocarbon combustion. As set forth hereinbefore, the reaction region is characterized by a high reaction rate and each reaction produces particles with a very high knietic energy. This energy exceeds the ionization potential of some of the particles in the reaction region and is dissipated in producing ion concentrations in excess of that which would be present at equilibrium. Excess ionization obtained in flames is basis for a high power density ratio in the reaction of hydrocarbon flames.

Considering a conventional engine using hydrocarbon or other suitable fuel, we have found the conditions under which the engine operates are determined by the thermodynamics of the combustion of the specific fuel considered and the specific configuration of the engine considered, and the maximum thrust attainable is determined by the maximum heating value of the fuel and by the efficiencies with which the available chemical energy is converted to kinetic energy in the exhaust. Thus, for a certain mission capability one selects a fuel which possesses sufficient chemical energy to provide the thrust required to perform the particular mission, considering the efficiencies which can be obtained by optimization of conventional engine design procedures to meet the requirements of the specific mission. The basic parameter which determines the behavior of the exhaust gases subsequent to combustion is the rate of reaction in the combustion zone of the burning fuel. This in turn is determined by the concentration of fuel particles possessing energy equal to or greater than the activation energy of the chemical reactions associated with the specific fuel. The reaction rate is determined by the concentration of activated particles at the equilibrium temperature of the fuel. This in turn is determined by the ratio of the rate at which energy is released by the fuel to the rate at which the energy is transferred to the nonreacting gases in the flow. Once this temperature is established the kinetic energy of the gas flow out the exhaust is determined by the difference between the temperature in the combustion zone and that at any point subsequent to the combustion zone or zone of the maximum temperature. The foregoing considerations make engine design possible in accordance with our invention, since other design considerations follow from the knowledge of the maximum flame temperature associated with any particular fuel, and the same considerations impose design maximum on the engine, since the maximum thrust available cannot exceed that associated with the fuel which possesses the maximum heating value available.

Other design limitations are imposed by the need for materials sufficiently resistant to thermal stress to retain structural integrity at temperatures attained with maximum heating value fuels. These limitations on engine design cannot be eliminated so long as consideration is limited to equilibrium conditions. As we have found, however, the overall design limitations are imposed by the concentration of particles capable of reacting at the maximum equilibrium flame temperature. Modifying this concentration results in thrust greater than that associated with equilibrium flame temperatures.

Under any conditions the concentration of particles depends upon the total number of particles present per unit volume. We have found any procedure which increases the concentration of particles possessing the activation energy required for a given chemical reaction or decreases the volume within which the total number of such particles is contained, will shift the equilibrium conditions in the direction of increased concentration of kinetic energy, i.e. greater thrust than the exhaust flow. The concentration of particles possessing the activation energy required for a given reaction depends upon the total number of particles of all kinds in the particle velocity distribution possessing sufficient energy to transfer activation energy to a receptive particle upon collision. In certain fuels, such as the hydrocarbons, which as a result of the combustion process produce ionization in excess of .001 percent, we have found it possible to act upon charged particles present with various combinations of electrical and magnetic fields to increase the total concentration of energetic particles in the reaction zone without initially changing the overall temperature of the region. Under such conditions the effect has been found to increase the total number of activated species by increasing the total number of effective collisions, and as a result the rate of reaction is increased in proportion to the increase in total number of effective collisions. Simultaneously, the rate of release of chemical energy is increased in proportion to the increase in reaction rate.

In the embodiments of our invention utilizing a magnetic field around the combustion gas stream, in determining the volume of the strengths of electric and/or magnetic fields required, the momentum of the charged particle effected by the electric fields and/or the magnetic field is preferably such that the maximum number of particles possess an energy equal to or greater than that necessary so that the particles transfer upon collision an amount of energy equal to or exceeding the activation energy of the particular fuel considered but less than that possessed by those particles whose energy is equal to or greater than those at the peak of the energy versus collision curve cross section for the particles affected by the enclosed fields and the particles which are to receive the energy upon collision. In the embodiments of our invention wherein a fluid is contacted with the combustion gas stream, mass flow and tangential velocity of the vortex of secondary or boundary layer of cooling fluid or air is determined by the combustion chamber temperature and pressure and is preferably within the range of approximately .05 to .15 pound of air per second and about 150 to 500 feet per second. In the specific applications, the actual flow will be such that inward radial pressure resulting from the vortex flow or boundary layer is equal to or exceeds the static radial pressure in the combustion zone whether in the presence or absence of modifying fields. The magnetic field used is variable from about 200 to 300 up to approximately 4000 to 5000 gauss.

These preferred operating conditions apply to the preferred specific method and means of our invention as set forth in the drawings and discussed hereinafter.

Referring now to the drawings, in detail, and to FIGS. 1-7 in particular, a hydrocarbon combustion generated plasma turbojet engine of the invention is shown generally at 20 in FIG. 1 and includes an elongated and generally cylindrical engine housing 22 which has a frusto-conical air inlet end portion 24 and a frusto-conical exhaust end portion 26. A generally cylindrical compressor case 28 is provided and is coaxially mounted in an upstream portion of the housing 22 and engages the inner end portion of the air inlet portion 24 of the housing to in operation receive oxygen containing air from the atmosphere. A plurality of supports 30 are desirably provided and extend radially outwardly from the compressor case 28 and the inner end of the air inlet end 24 of the housing to the outer portion of the housing to thereby rigidly mount the forward portion of the compressor case in the housing. The compressor case desirably has a plurality of rib-like stator members 32 secured to the inner surface thereof and projecting generally radially inwardly therefrom with the members 32 preferably being arranged in axially spaced rows and being circumferentially spaced from each other.

An elongated turbine shaft 34 is coaxially and rotatably positioned in the housing 22 and extends into the inlet end portion 24 and the exhaust end portion 26 of the housing. The forward portion of the shaft 34 can be mounted in bearings 36 and 38 at the ends of the compressor section of the engine and bearing 36 is carried by supports 40 which extend radially outwardly therefrom and are connected to the supports 30 for the compressor case 28. The rear portion of the turbine shaft 34 is rotatably mounted by a bearing 42 carried by supports 44 which are connected in their outer end to an axially extending portion of a mounting ring 46.

An elongated and generally cylindrical compressor rotor 50 is mounted on the forward portion of the shaft 34 and positioned within the tubular compressor case 28. The rotor 50 preferably has a plurality of vanes 52 mounted on the outer surface thereof projecting radially therefrom. Preferably, the vanes 52 are positioned in spaced annular rows with the radially extending vanes or rows of vanes being positioned between adjacent ones of the rows of the rib-like members 32 on the compressor case 28. The vanes 52 are preferably circumferentially spaced apart and are shaped to cooperate with the rib-like members 32 on rotor case to in operation compress air or other fluids passing into the compressor from the air inlet portion 24 of the housing to thereby deliver compressed air or fluids to the downstream or right-hand side of the compressor as shown in FIG. 1.

A starter motor 54 is preferably provided and positioned at the upstream end of the turbine shaft 34 and is operatively connected to the turbine shaft by gears 56 and 58 on the motor and turbine shaft, respectively. The starter motor and connection thereof to the turbine shaft can be of conventional construction and operate to turn the turbine shaft 34 during initial start up of the engine and thereby provide a power means for initially compressing air or other fluids by the compressor. A generator 60 can also be provided and connected by gear 62 to the gear 58 on the turbine shaft 34 so that in operation rotation of the shaft 34 generates electricity to run accessories and other equipment required for the engine, etc. A streamlined motor cover 64 is provided to enclose the motor 54 and generator 60 and can be connected at the inner end to the support 40 to be supported by the shaft 34 and/or the housing 22.

A turbine wheel 68 is mounted on the downstream end of the turbine shaft 34 and is connected thereto to turn therewith in operation. The turbine wheel 68 is mounted on shaft 34 in spaced relation to the downstream end of the compressor and the wheel 68 has a plurality of radially extending vanes 70 secured to and projecting from the radially outer surface thereof and the vanes 70 are shaped and positioned to in operation be engaged by air or gases under pressure passing thereacross to cause rotation of the turbine wheel 68 and of the shaft 34 to thereby drive the compressor rotor 50.

A tail cone of bluff 72 is provided and is preferably conical in shape with the apex of the tail cone being at the downstream end thereof and with the enlarged or base portion being positioned at the downstream end of the turbine wheel 68. The tail cone 72 can be mounted in the housing in any suitable manner, such as by the use of supports 74 connected to the base portion of the tail cone and to the exhaust end portion 26 of the engine housing 22. The tail cone 72 and the exhaust end portion 26 of the housing 22 together define a space diverging from the turbine vanes 70 to the outlet end of the engine housing 22.

A hollow tube or support member 78 is positioned between the downstream end of the compressor and the upstream end of the turbine wheel 68 and the forward portion thereof can be connected to the bearing 38 and the rear portion thereof can be connected to the supports 44. A plurality of air conduits or tubes 80 are provided and are positioned in the housing 22 between the compressor and the turbine wheel 68 and are preferably supported by the supports 78 and by additional brackets or supports 82 and 84 or other suitable means as desired. Each of the conduits 80 has end portions 86 and 88 which are restricted or have a relatively small diameter in relation to the intermediate or center portion thereof and one end portion 86 is positioned at the outlet end of the compressor vanes or rib-like members to receive compressed air therefrom and the other end portion 88 of the air tubes or conduits are positioned at the upstream side of the vanes 70 on the turbine wheel 68.

A plurality of hollow elongated cylinders 90 defining combustion chambers are provided and each has a bulbous-shaped end portion 92 and tapers to a generally tubular end portion 94 and is preferably provided with a plurality of holes or openings 96 in the bulbous end and intermediate portion thereof. Each of the air conduits 80 has one of the cylinders 90 positioned therein with the bulbous end 92 of the cylinder being intermediate the ends of conduits 80 and with the tubular end portions 94 preferably terminating upstream of the downstream end 88 of the air cylinder. The cylinders 90 are of shape, size and mounted relative to the conduits 80 so that a major portion of the outer surface of the cylinders are spaced from the inner surface of the conduits and cooperate with the conduits to provide a path for secondary air and in operation a major portion of the air entering the tubes 80 passes through the holes 96 in the combustion chamber 90 and out the exhaust end portion 94 thereof with a minor portion of the air entering the tubes 80 passing between the downstream or outlet end 94 of the cylinders 90 and of the downstream end 88 of the air condits and providing an annulus of secondary air.

Means are preferably provided with the air conduits and cylinders so that the secondary air passing therebetween will be spiraled or turned into a vortex of air as it passes around the end portion 94 of the cylinder 90 and leaves the space between the end portion 94 of the cylinder and the air conduit 80. In the preferred embodiment of the invention illustrated in the drawings and as best illustrated in FIG. 3, a plurality of ribbons 98 are provided and are spirally mounted along the outer surface of the end portion 94 of the cylinder 90 and engage the inner surface of the end portion 88 of the air conduit 80 and the ribbons 98 are twisted or spiraled as illustrated in FIG. 3 so that secondary air passing thereacross is twisted or turned into a vortex to create a turbulence at the exhaust end 94 of the cylinders with the resulting vortex being generally annular in shape and surrounding the exhaust gases as illustrated by the arrows in FIG. 3. This vortex of secondary air and the turbulence created thereby results in a radially inwardly directed pressure against the exhaust gases leaving the cylinders 90 and tends to compress or constrict the exhaust gases. In addition, the secondary air layer is cool relative to the ionized exhaust gases and as a result of this temperature differential there is a difference in electrical conductivity between the exhaust gases and the secondary air with the exhaust gases having a lower electrical resistance than the secondary air as a result of the temperature difference and this difference in conductivity aids in the constriction of the exhaust gases. The constriction of these exhaust gases resulting from the boundary layer of secondary air and including both the radial pressure and the difference in electrical conductivity causing the constriction is referred to as a thermal pinch on the exhaust gases. It is to be understood that at least partial ionization of a fuel has taken place in the combustion chamber as a result of burning of the fuel therein. And, as a result of constriction of exhaust gases and the concentration of thermal energy therein, the temperature and velocity of the exhaust gases is substantially increased. Since the vortex of fluid is cooler than the exhaust gases and surrounds the exhaust gases higher temperature can be obtained in the exhaust stream without adversely affecting the containing walls, the vortex of fluid acting as an insulator to limit heat transferred to the containing walls from the exhaust gases.

A plurality of fuel spray nozzles 100 are provided and are mounted in the upstream portion of the air conduits 80 and open into the bulbous end portion of the cylinder 92 and the nozzles 100 are connected to a source of fuel by tube or conduit means 102. The fuel nozzles 100 spray a suitable fuel into the cylinders 90 for mixing therein with air or other oxygen containing gas passing through the holes or openings 96 and the fuel is burned in the cylinders 90 with the resulting exhaust gases passing through the outlet end 94 thereof. Suitable means for igniting the fuel are provided and can include a spark plug or the like 104 for initially igniting the fuel and in operation the burning process is a continuing process which does not normallly require periodic ignition. The fuel is normally a hydrocarbon fuel, such as JP-4, and in burning at least partial ionization of the fuel normally results.

Means are preferably provided to apply a magnetohydrodynamic pinch or constriction to the exhaust. For this purpose electromagnetic means 106 are provided and positioned at the downstream end portions of the air conduits 80 downstream of the cylinders 90 and the electromagnetic means are positioned around the exhaust gases passing through the conduits 80. In the preferred embodiment illustrated in the drawings, the electromagnetic means 106 comprises a plurality of turns of an electrical conductor as best illustrated in FIG. 3 with the end portions of the conductor being electrically connected to a suitable source of electric power, such as to the generator 60, so that when electric power is applied to the conductor a magnetic force is provided around the exhaust gases passing through the end 88 of the conduit 80. The ionized particles in the exhaust gases are repelled by the magnetic force to cause a constriction of exhaust gases passing therethrough and this constriction of exhaust gases results in an increase in the temperature and velocity of the exhaust gases. As the exhaust gases are discharged from the end 88 of the tubes 80, they pass across the vanes 70 on the turbine wheel 68 and the vanes are inclined as described hereinbefore so that gases passing thereacross cause rotation of the wheel 68 and the turbine shaft 34 connected thereto to thereby drive the compressor rotor 50 and furnish additional compressed air to the conduits 80. The exhaust gases passing through the turbine blades 70 are then exhausted to the atmosphere through the space between the end portion 26 of the housing 22 and the outer surface of the cone 72 and since the velocity of the exhaust gases has been increased as a result of the thermal pinch and magnetic pinch applied to the exhaust gases, the thrust produced by the engine is substantially greater than would occur in the absence of the means for pinching or constricting the exhaust gases.

Other means to provide a thermal pinch and electromagnetic pinch to the exhaust gases can be provided at the downstream end portion of the engine housing and used as an alternative or in addition to the previously described means for producing a thermal pinch and electromagnetic pinch. As best illustrated in FIGS. 1, 4, 5, 6 and 7, a plurality of air tubes 110 are mounted on the exhaust end portion 26 of the housing 22 with each of the tubes 110 having the inlet end portion thereof positioned at the outer surface of the housing 22 and with the inlet end of the tubes being elevated slightly as best illustrated in FIGS. 1 and 6 so that the tubes 110 can receive air from the atmosphere. The outlet end portion of each of the tubes 110 opens into the exhaust end portion 26 of the engine housing downstream of the turbine wheel 68 and into the space between the cone 72 and the housing portion 26. The tubes 110 are preferably shaped and positioned as best illustrated in FIG. 7 so that ram air received at the inlet end of tubes 110 is changed in direction from an axial flow to a circumferential flow around the housing 26 when discharged into the housing with this vortex of secondary air flowing in a direction substantially perpendicular to the direction of movement of the exhaust gases, that is, substantially perpendicular to the axis of the exhaust end portion 26 of the housing. The secondary air is then substantially tangent to the surface of the exhaust end portion of the housing and creates an annular boundary or secondary layer of air which is moving in a vortex of swirling manner and creates turbulence around the exhaust gases and has an inwardly directed component of force to cause constriction or compression of the exhaust gases. The secondary air is cool relative to the exhaust gases and there is an electrical conductivity differential between the secondary air and the exhaust gases which results in self-fields being induced in the exhaust gases which further causes constriction of the exhaust gases and a resulting increase in temperature and velocity of the exhaust gases. Preferably, the tubes 110 are positioned in staggered relation circumferentially around the housing and axially along the housing as best illustrated in FIG. 7 to provide a longitudinal dimension to the vortex of secondary or boundary air.

Valve means are preferably provided with the conduits or tubes 110 to regulate the volume of air passing therethrough and a preferred embodiment of the valve means is shown generally at 112 in FIG. 4. The valve means includes a shaft 114 mounted in tube 110 which has a circular disk 116 secured to the center portion thereof and the disk 116 is of size and shape so that when positioned across the tube 110 as shown in FIG. 4, the tube 110 is closed to the passage of air therethrough and when the disk 116 is moved to a position substantially perpendicular to the position illustrated in FIG. 4 then the tube 110 is in the fully open position and the maximum amount of air can pass therethrough. The disk 116 can be adjusted by any suitable means. As illustrated in the drawings, a small electric motor 118 is mounted in a housing or cover 120 connected to the tube 110 and the output shaft of the motor 118 has a gear 122 connected thereto which meshes with a gear 124 on the shaft 114 to turn same.

An alternative valve structure is shown in FIG. 5 of the drawings where a shaft 126 is mounted in tube 110 and has a member 128 connected thereto and the member 128 is preferably in the shape of a hemisphere. When the member 128 is positioned as illustrated in FIG. 5 the tube 110 is open to the passage of air as illustrated by the arrows in FIG. 5 and when the member 128 is rotated 90 degrees about the axis of shaft 126 the tube 110 is completely closed to the passage of air. The shaft 126 can be adjusted in the same or similar manner to that illustrated in FIG. 4.

Means to cause an additional magnetic pinch on the exhaust gases is preferably provided downstream of the air tubes 110. As illustrated in FIG. 1 the electromagnetic means 130 can be provided by a plurality of turns of an electrical conductor around the exhaust end portion 26 of the housing and the conductor is electrically connected in the ends to a source of electric power, such as the generator 60. The operation of the electromagnetic means 130 is the same or similar to that previously described in connection with the conductor 106.

The thermal and magnetic pinch to the exhaust gases can be provided by tubes 110 and magnetic means 130 at the downstream or exhaust end portion of any engine housing. This means for providing a thermal and magnetic pinch can be used either alone or in combination with the other means described in connection with the turbojet or other engine means.

Referring now to FIG. 2 of the drawings, a modified turbojet engine construction is illustrated wherein an air tube or conduit 140 is provided and has a restricted or relatively narrow end portion 142 mounted relative to the downstream end of a suitable compressor structure 144, to receive air or fluid under pressure therefrom. A cylinder 146 is provided and has a bulbous shaped end portion 148 positioned at an intermediate portion of the conduit 140 with the other end portion 147 and the intermediate portion of the cylinder being generally tubular in shape and with the other end portion 147 of the cylinder terminating downstream of the downstream end 143 of the conduit 140. The downstream end 143 of conduit 140 snugly engages the outer surface of the cylinder 146 and can be connected to the cylinder and/or to a wall 150. Cylinder 146 has a plurality of holes 152 through the intermediate portion and the bulbous portion thereof and the axis of the holes 152 are preferably inclined circumferentially relative to a radius passing therethrough so that air provided to the conduit 140 passes entirely through the holes or openings 152 and by virtue of the direction of the holes the air entering the cylinder 156 is rotated into a vortex of air.

A fuel spray nozzle 154 is mounted in the bulbous end of the cylinder 146 and is connected to a source of fuel by a fuel line 156. A plurality of ribbons 158 are preferably provided and secured to the nozzle 154 adjacent the outer surface of the bulbous end 148 of the cylinder, and the ribbons 158 are shaped and positioned in the conduit 140 to cause air passing through the conduit to be turned in a helical manner for discharge through the holes 152 into the cylinder 146. Fuel entering the cylinder 146 is ignited by any suitable means, such as a spark plug or the like 160 to initially ignite the fuel therein and cause combustion thereof. The swirling vortex of air created by the ribbons 158 in the holes or openings 152 surrounds the combustion products or exhaust gases in the cylinder 146 and provide a vortex of secondary air which causes a thermal pinch on the exhaust gases to constrict same and increase the temperature and velocity of the exhaust gases leaving the cylinder 146 in the manner previously explained.

Magnetic means, such as the electromagnetic means 162 are provided by a plurality of turns of a conductor surrounding the exhaust end portion of the cylinder 146 and connected to a suitable source of electric power and provides a magnetic pinch on the exhaust gases leaving the cylinders to further constrict same and result in an additional increase in temperature and velocity of the exhaust gases. The exhaust gases leaving the cylinder 146 pass through the vanes 164 of a turbine wheel 166 to cause rotation thereof in a manner similar to that described in connection with FIG. 1. The exhaust gases then pass through the exhaust portion of the engine housing and can be further constricted by a vortex of fluid and/or electromagnetic means in the manner described hereinbefore in connection with the tubes and electromagnetic means illustrated at 110 and 130 in connection with FIG. 1. The engine structure of FIG. 2 is particularly useable in connection with a turbojet engine construction which is otherwise constructed in the same or similar manner as illustrated in FIG. 1.

Figure 8:
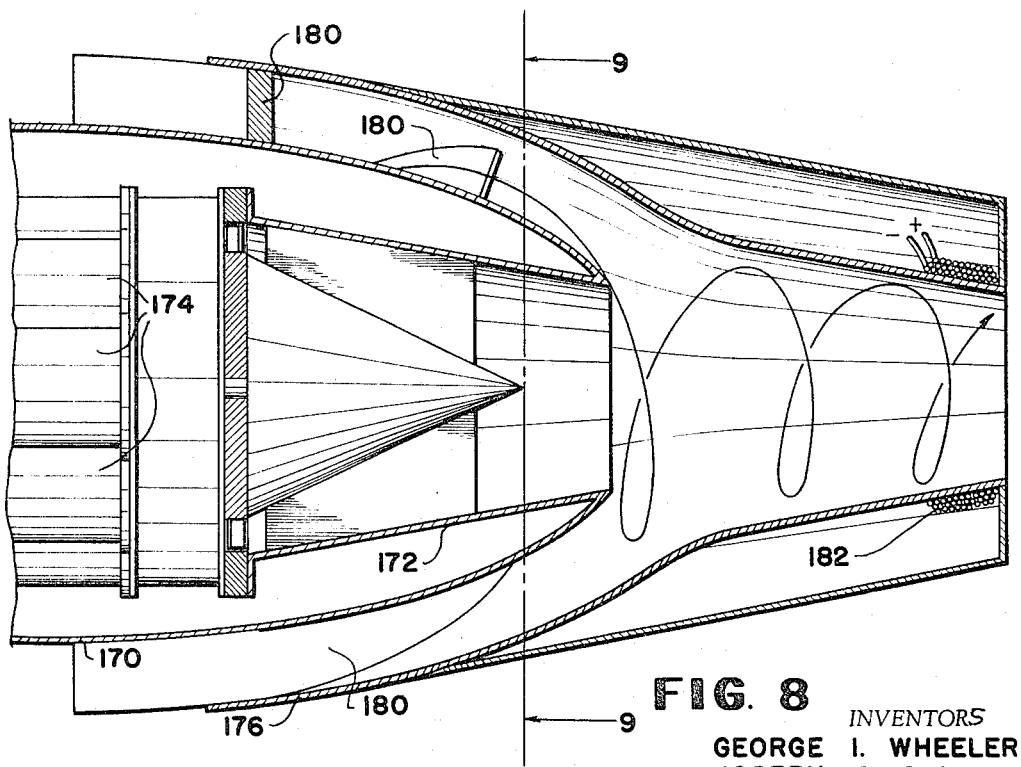
FIG. 8 is an enlarged partial longitudinal cross sectional view through a modified engine construction.
Figure 9:
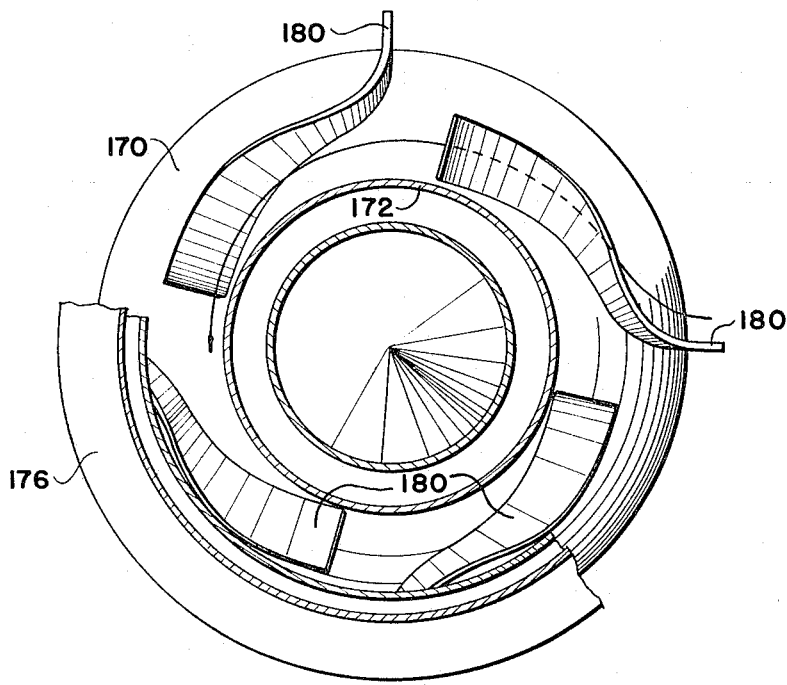
FIG. 9 is an enlarged transverse cross section view taken along the line 9—9 of FIG. 8.

Another preferred specific embodiment of means for providing a thermal and/or magnetic pinch on the exhaust gases to increase the velocity thereof is illustrated in FIGS. 8 and 9 of the drawings. As illustrated in these drawings, an engine housing 170 having an exhaust end portion 172 receives exhaust gases from a plurality of air conduits 174 containing combustion chambers and such can be of the same or similar construction as that illustrated in FIGS. 1 and 2 of the drawings. In this embodiment an elongated shroud 176 is provided and is positioned around the housing 170 and is connected thereto in any suitable manner. The shroud as illustrated in the drawings extends from a position upstream of the exhaust portion 172 of the housing 170 to a position downstream of the housing 170 and the inner surface thereof converges from an upstream end toward the downstream end and defines an air passageway to receive ram air from the atmosphere and direct same inwardly.

A plurality of elongated metallic ribbons 180 are secured in their edge portions to the exhaust end portion 172 of the housing 170 and to the inner surface of the shroud 176 to mount the shroud in position. Preferably the ribbons extend in a helical direction relative to the axis of the housing 170 and the shroud 176 to thereby cause ram air passing through the shroud to be directed in a helically inwardly moving path or vortex and the air surrounds the exhaust gases leaving the exhaust portion 172 of housing 170. This vortex of atmospheric air is cool relative to the hot exhaust gases and acts upon the exhaust gases in the manner described hereinbefore in order to compress or constrict the exhaust gases and results in an increase in the temperature and velocity of the exhaust gases.

Suitable magnetic means are preferably provided downstream of the exhaust end portion 172 of the engine housing 170 to cause further constriction of the exhaust gases and this can be provided by an electromagnet 182 which includes a plurality of turns of an electrical conductor positioned within the shroud 176 at the downstream end thereof which are connected to a source of electric power to in operation provide a magnetic field around the exhaust gases and result in construction thereof in the manner previously described. The use of the shroud having the ribbons therein and the electromagnetic means therewith to provide the thermal pinch and magnetic pinch on the exhaust gases can be used with any suitable engine means, either alone or in combination with other means to constrict exhaust gases as described in the application.

The operating conditions of the turbojet engine of the invention is variable due to design considerations, fuels used, thrust desired, and various other considerations, and the following information or data is given by way of illustration and is not to unduly limit the scope of the invention. Assuming air is entering the inlet portion 24 of the engine at a pressure of substantially one atmosphere, and at approximately ambient temperature of about 500 degrees R. and at a velocity of approximately 100 to 400 feet per second, the air passing through the inlet portion of the housing is compressed slightly to approximately 1¼ to 1½ atmospheres of pressure and this increases the temperature of the air entering the compressor to approximately 550 degrees R. and the velocity of the air entering the compressor is approximately 250 to 500 feet per second. As the air passes through and is compressed in the compressor portion of the engine, the pressure of the air is increased to approximately 4 to 6 atmospheres of pressure and causes an increase in the temperature of the air to a temperature of approximately 700 to 900 degrees R. and the air leaves the compressor at a velocity of approximately 250 to 500 feet per second. In the combustion chamber or zone of the engine, the velocity of the air passes therethrough at approximately 250 to 500 feet per second and there is a slight pressure drop from the upstream to the downstream end of the combustion zone so that the exhaust gases leave the combustion zone at a pressure of approximately three to five atmospheres. Due to burning of the fuel in the combustion chamber partial ionization of the fuel-air mixture results and the temperature increases in the combustion zone from approximately 700 to 900 degrees R. to approximately 1400 to 3000 degrees R. The vortex of air causing the thermal pinch will have a mass flow of approximately .05 to .15 pound of air per second at a velocity of about 150 to 500 feet per second and the magnetic field causing the magnetohydrodynamic pinch will be from 200 to 5000 gauss. As a result of the thermal and magnetic pinches on the exhaust gases as they leave the combustion chamber and enter the turbine, increases in velocity and temperature on the order of 5 to 50 percent are expected. Thus, the exhaust gases entering the turbine stage of the engine will have a velocity of approximately 275 to 750 feet per second and the temperature thereof will be approximately 1600 to 4500 degrees R. Passing through the turbine stage there is a drop in temperature and pressure and an increase in the velocity of the exhaust gases and as they leave the turbine section a temperature of approximately 1400 to 3000 degrees R. and a pressure of approximately 1 to 3 atmospheres at a velocity of approximately 400 to 1500 feet per second can be expected. As the exhaust gases pass through the exhaust portion or nozzle of the engine housing, the pressure will drop to approximately 1 atmosphere and the velocity of the gases will increase to approximately 700 to 3000 feet per second with the temperature of the exhaust gases leaving the engine housing being approximately 1500 to 3500 degrees R. Where additional thermal and/or magnetic pinches are provided in the exhaust section of the engine, a further increase of approximately 5 to 50 percent in the temperature and velocity of the exhaust gases can be expected with a vortex mass flow and magnetic field on the order of those set forth hereinbefore.

Figure 11:
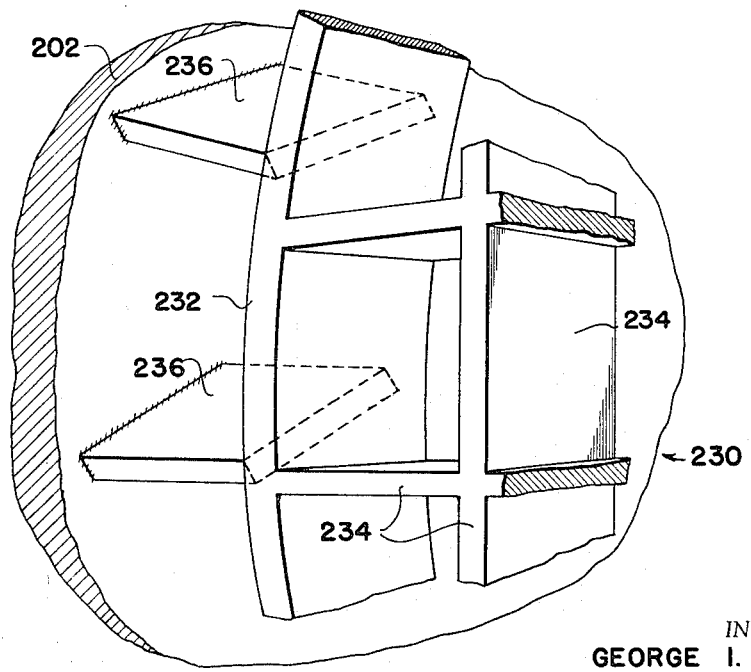
FIG. 11 is an enlarged partial isometric view showing a portion of the flame holder structure of the engine of FIG. 10.

Referring now to FIGS. 10–12 of the drawings, a preferred specific embodiment of a plasma ram jet engine is shown generally at 200 and includes an elongated and generally cylindrical engine housing 202 which has an open air inlet end portion 204 and an open exhaust end portion 206. A power accessories housing 208 is positioned in the inlet end portion 204 of the housing 202 and is desirably of a streamlined configuration as illustrated at FIG. 10 and has a forward end portion 210 which projects from the engine housing 202 and is substantially pointed at the forward end thereof. The housing 208 has a downstream end portion 212 which tapers to an apex at the downstream end thereof and the center portion of housing 208 is enlarged relative to the end portions thereof and is generally tubular in shape and smoothly merges into the end portions. End portion 210 of housing 208 defines a supersonic diffuser and the intermediate portion of housing 208 and the adjacent portion 204 of housing 202 together define a subsonic diffuser and in operation air passing therebetween is decelerated and compressed. Housing 208 can be mounted in engine housing 202 by suitable supports or the like 214 which are secured to the engine housing 202 and the accessories housing 208 and extend radially along the engine housing. Housing 208 can contain any suitable equipment necessary for operation of the engine including a turbine 216 which has an air inlet portion 218 positioned between the housing 208 and the engine housing 202 to receive compressed air therefrom and the turbine 216 can be operatively connected to a pump for fuel or the like as shown at 220.

The pump 220 can be connected to a suitable supply of fuel (not shown) and the outlet of the pump is connected by conduit 222 to an annular fuel manifold 224 which is mounted on an intermediate portion of the power accessories housing 208 and in operation discharges fuel into the engine housing to be mixed with air passing between the accessories housing 208 and the engine housing 202 for combustion downstream thereof.

A flame holder is shown generally at 230 in the drawings and in the preferred embodiment illustrated, the flame holder includes an annular outer member 232 which is coaxially positioned within the engine housing 202 and located immediately downstream from the apex of the end 212 of the power accessories housing 208. The annular member 232 has a network of open rectangular baffle members 234 secured thereto as best illustrated in FIG. 11 with the members 234 extending across the annular member 232 and forming a plurality of ports or cavities which are rectangular in cross section and extend axially along the engine housing 202.

A plurality of radially extending ribbons or vanes 236 are secured to the inner surface of the engine housing 202 and secured to the outer surface of the annular member 232 of the flame holder 230 and mount the flame holder in the desired position within the engine housing 202. The ribbons 236 are preferably elongated and extend longitudinally along the engine housing 202 with the side surfaces of the ribbons being inclined relative to a plane passing through the axis of the engine housing to in operation create a boundary layer or vortex of helically moving fluid passing through the flame holder cavities or openings. This movement of the secondary layer or vortex of air is illustrated by the arrows in FIG. 10.

A combustion chamber 240 is provided in the engine housing 202 and positioned immediately downstream of the flame holder 230 and in operation fuel from manifold 224 passes through the flame holder 230, enters the combustion chamber 240 and a continuous combustion process occurs therein, burning the fuel with the resulting exhaust gases being discharged through the outlet or exhaust end portion 206 of the housing 202. The structure, positioning, and mounting of the ribbons or vanes 236 creates a boundary layer or vortex of secondary air surrounding the center portion of combustion chamber 240 and causes an inwardly directed force on the resulting exhaust gases to constrict same in the manner described hereinbefore.

Magnetic means are preferably provided and around the exhaust gases and the exhaust gases pass through the field of the magnetic means prior to being discharged from the outlet end 206 of the housing 202. In the preferred embodiment illustrated in the drawings, the magnetic field is provided by an electromagnet shown at 242 formed by a plurality of turns of an electrical conductor is mounted in a recess or cavity 244 in the exhaust end portion 206 of the engine housing and the conductors forming the electromagnet are connected to a suitable source of electric power so that in operation the exhaust gases passing through the exhaust end portion 206 of the housing pass through the field of the magnet 242 with the magnet causing a magnetic pinch on the exhaust gases in the manner previously described.

A modified construction of the ram jet engine is illustrated in FIG. 12 of the drawings where the tail end portion of an engine housing is shown at 250 and includes an outer portion 251 and an inner frusto-conical portion or member 252 which together define an annular chamber or space extending substantially from the flame holder 230 downstream to the exhaust end of the engine housing 250. The inner member 252 converges from a relatively large diameter at a forward portion to a relatively small diameter at the exhaust end of the housing and provides means for constricting flow of exhaust gases through the housing. In this instance, the magnetic means is provided by an electromagnet shown at 256 which includes a plurality of turns of an electrical conductor connected to a suitable source of electric power and the electrical conductor extends a substantial distance along the length of the housing 250, preferably from immediately downstream of the flame holder to the end of housing 250 as illustrated in the drawings. This provides a relatively long magnetic field through which the exhaust gases pass and the exhaust gases are thus subject to the effects of the magnetic field for a longer interval of time. The magnetic field is illustrated by the arrows extending from the portions 251 and 252 of housing 250. The ribbons or vanes shown at 236 in the flame holder 230 function as previously described to provide the desirable vortex of secondary air as illustrated by the helical arrows in FIG. 12.

For a ram jet engine such as shown in FIGS. 10–12 the operating conditions of the engine will be variable depending upon design criteria, thrust to be obtained for a particular mission or capability, etc. The following information and data relating to performance of the engine is given by way of illustration and is not to unduly limit the scope of the invention. The internal air flow rate of the engine is approximately 20 to 50 pounds per second and the velocity at the exit of the subsonic diffuser is about 125 to 175 feet per second and the fuel flow rate is approximately 1 to 1.5 pounds per second. The air enters the inlet diffuser portion of the engine at approximately atmospheric temperature and pressure and when the engine is operating at Mach 2.0 the air as it enters the engine housing has a pressure of approximately 1½ to 3 atmospheres. The air passes through the supersonic and subsonic diffusion portions of the engine housing as defined by the housing and the accessories housing and the pressure of the air is increased to approximately 2 to 4 atmospheres at the center portion of the diffusion section and to approximately 3 to 6 atmospheres at the end of the diffusion section with the temperature being increased as a result of the increase of pressures from approximately 500 degrees R. to approximately 550 to 1500 degrees R. At the end of the diffuser the air has a velocity of approximately 125 to 175 feet per second. As the air passes through the flame holder a slight decrease in pressure and an increase in velocity occurs and the air enters the combustion chamber and the fuel is ignited therein. Burning of the fuel results in partial ionization of the fuel-air mixture. There is a pressure drop across the combustion chamber with the pressure of the fluid or exhaust gases leaving the combustion chamber being at approximately 2 to 5 atmospheres and with the velocity of the gases in the combustion chamber increasing as they flow through the combustion chamber so that they leave the combustion chamber at a velocity of approximately 300 to 500 feet per second and with the temperature at the downstream end of the combustion being approximately 1500 to 3000 degrees R. The vortex of secondary air passing through the ribbons around the flame holder has a mass of approximately .05 to .15 pound of air per second and the vortex has a velocity of about 150 to 500 feet per second. The temperature and velocity of the exhaust gases are increased approximately 5 to 50 percent as a result of the thermal pinch caused by the vortex of air around the exhaust gases. A further constriction of the exhaust gases is provided or results from the magnetic pinch, the magnetic field being approximately 200 to 5000 gauss, and when the gases leave the engine housing through the exhaust end thereof, or nozzle thereof, the pressure of the exhaust drops to approximately atmospheric pressure and the velocity of the exhaust gases is increased to approximately 700 to 3000 feet per second with the temperature at the exhaust being approximately 1500 to 3500 degrees R.

Referring now to FIGS. 13–15 of the drawings, a preferred specific embodiment of a pulse jet engine of the invention is shown generally at 300 and includes an elongated and generally cylindrical engine housing 302 having an inner wall 304 which is generally tubular in shape and includes an open air inlet portion 306 and an open exhaust end portion 308, the exhaust end portion being generally tubular and smaller in diameter than the center portion of wall 304 as illustrated in the drawings. An annular fuel manifold 310 is positioned in the air inlet end portion 306 of housing 302 and is best illustrated in FIG. 15 of the drawings. The manifold 310 preferably has an annular hollow portion 312 which is in communication with a plurality of openings or nozzles 314 which extend radially to the inner and outer surface of the manifold 310. The annular space 312 is in fluid communication with one or more fuel conduits 316 which are connected to the manifold 310 and the housing portion 304 to mount the manifold in place and are connectible to their outer end portion to a supply of fuel (not shown). The conduits 316 serve as supports for the manifold and, if desired, additional support means can be provided for the manifold.

A valve bank 320 is positioned in the housing adjacent and downstream of the manifold 310 and is connected to the inner wall 304 of the housing in any suitable manner. The valve bank 320 preferably includes a plurality of spaced fixed ribs 322 and 324 as best illustrated in FIG. 14. A plurality of flexible metal strips 326 are each connected in an upstream end portion to the ribs by fastening means such as shown at 328 with the other end of the strips 326 being normally positioned as illustrated in FIG. 14 to close the valve bank. In operation ram air passing through the engine housing in the direction shown by the arrows in FIG. 14 force the metal strips 326 toward the ribs 324 to open same to the passage of ram air. When the pressure from the downstream or right side of the valve bank as viewed in the drawings exceeds the ram air pressure on the upstream or left side of the valve bank, the flexible strips or members 326 return to the closed position shown in FIG. 14 to prevent passage of fluids through the valve bank. This back pressure is caused by combustion of fuel in the combustion chamber of the engine.

The portion of the inner wall 304 of the housing 302 between the valve bank 320 and the exhaust end portion 308 of the housing defines a combustion chamber shown generally at 330 wherein the fuel from fuel manifold 310 which has passed through valve bank 320 is burned. Suitable fuel ignition means, such as the sparkplug or the like shown at 332 can be mounted in wall 304 of housing 302 to initially ignite the fuel in the combustion chamber 330 and during normal operation of the engine subsequent ignition of the fuel is a result of the residual gases in the combustion chamber igniting new fuel passing through the valve bank 320. The number of pulses or firings of the engine is variable with engine design and construction.

Means are provided with the engine housing 302 to surround the exhaust gases with a vortex or layer of secondary air to result in a thermal pinch on the exhaust gases passing through the exhaust end portion 308 of the housing 302. As illustrated in the drawings, this vortex of fluid can be provided by a plurality of air tubes 334 which are mounted in the housing 302 between the outer wall thereof and the tubular portion defining the exhaust end portion 308 of the housing and each of the tubes 334 is positioned so that the outer or inlet end portion thereof is positioned at the outer surface of the housing to in operation receive ram air from the atmosphere end with the outlet end portion of the tubes opening into the exhaust end portion 308 of the engine housing downstream of the combustion chamber. The mounting, shape and arrangement of the air tubes 334 can be same or similar to that shown and described hereinbefore in connection with FIGS. 1 and 7. Also, adjustable valve means as shown at 336 are preferably provided with each of the tubes 334 to in operation regulate the flow of air through the tubes and the valve means 336 can be adjustable by suitable power means 338 such as the motor described in the previous embodiments. The shape and mounting of the tubes 334 is such that ram air provided to the engine housing is discharged in a direction which is substantially perpendicular to the axial direction of flow or movement of the exhaust gases and is substantially tangent to the surface of the exhaust end portion 308 of the engine housing 302 to provide a vortex of helically moving secondary air which is cool relative to the hot exhaust gases and functions to provide a thermal pinch or constriction on the exhaust gases which results in an increase in the temperature and velocity of the exhaust gases passing through the exhaust end portion 308 of the housing.

Suitable magnetic means 340 are preferably provided and are positioned in the exhaust end portion 308 of the engine housing 302 and are desirably located at the downstream end thereof. The magnetic means 340 can be provided by a plurality of turns of an electrical conductor having the end portions 342 and 344 thereof connected to a suitable source of electric power. In operation, the electromagnetic means act upon the exhaust gases passing therethrough to cause a magnetic pinch on the exhaust gases and result in a constriction of the exhaust gases with a corresponding increase in the temperature and velocity of the exhaust gases which then leave the engine housing 302 and result in a thrust on the engine.

For a pulse jet engine such as shown in FIGS. 13–15, the operating conditions are variable depending upon thrust desired for a specified mission capability, design criteria, etc., and the following information and data regarding operation of the engine is given by way of illustration and is not to unduly limit the scope of the invention. Assuming the air entering the air inlet is at approximately atmospheric temperature and pressure and at an air to fuel ratio of approximately 30 to 1, a major portion of the air and fuel pass through the valve bank into the combustion chamber 330 at slightly less than atmospheric conditions due to expansion in the housing. Ignition of the fuel in the combustion chamber results in an increase in the pressure in the combustion chamber to approximately 2 to 3 atmospheres and the pressure in the exhaust gas stream returns to approximately atmospheric pressure as it leaves the downstream or exhaust end portion of the housing. The increase of pressure closes the valve bank until the exhaust gases leave the combustion chamber and the valve bank will be opened and closed approximately 40 to 300 times per second. The temperature of the gas in the combustion chamber is increased as a result of combustion of the fuel therein to a temperature of approximately 1500 to 3000 degrees R. The vortex of secondary air surrounding the exhaust gases preferably has a mass of approximately .05 to .15 pound per second and a velocity of about 150 to 500 feet per second which causes an increase in the temperature and velocity of the exhaust gases to approximately 1600 to 4500 degrees R. and about 400 to 750 feet per second. Further constriction of the exhaust gases results from the magnetic pinch with the magnetic field preferably being approximately 200 to 5000 gauss to result in a further increase in the temperature and velocity of the gases by approximately 5 to 50 percent so that the exhaust gases leave the engine at a temperature of approximately 1700 to 6500 degrees R. and at a velocity of approximately 500 to 1300 feet per second.

Referring now to FIGS. 16–19 of the drawings, a preferred specific embodiment of a plasma rocket is shown generally at 400 and includes an elongated housing 402 which is generally cylindrical in shape and has a closed and streamlined nose portion 404 and is open at the exhaust end portion 406. The housing 402 is preferably streamlined on the outer surface thereof and can be provided with a plurality of fins 408 at the exhaust end portion 406 thereof which are mounted on and project from the outer surface and converge from the downstream end thereof to the upstream end where they smoothly merge into the sides of the housing 402. An elongated hollow fuel tank 410 is positioned within the housing 402 and can be connected thereto by suitable supports 412. An elongated and hollow oxidizer tank 414 is positioned within the housing 402 adjacent the fuel tank 410 and can be mounted in place by suitable supports or the like 416. A gas storage tank 418 can be provided and positioned in the nose portion of the housing 402 and the gas storage tank 418 can receive and hold a pressurized gas for use as control means and to maintain a positive pressure within the fuel tank 410 and oxidizer tank 414 to prevent formation of a vacuum therein during removal of fuel or oxidizer therefrom. The gas storage tank 418 is connected to the oxidizer tank 414 by a conduit 420 and is connected to the fuel tank 410 by another conduit 422.

A rocket engine is shown generally at 424 and is mounted in the housing 402 at the exhaust end portion 406 thereof and engine 424 has a closed end portion having a combustion chamber 426 therein which opens directly into an unobstructed nozzle or exhaust end portion 428 and the outlet end of the nozzle portion 428 is positioned at the exhaust end 406 of the housing 402 to discharge gases to the atmosphere through the nozzle and results in a thrust on the rocket. As illustrated in FIG. 16 of the drawings the engine 424 has a closed inner end and the walls of the combustion chamber 426 and nozzle portion 428 diverge outwardly from the closed end of the engine and are generally frustoconical in shape and the nozzle smoothly merges into the combustion chamber.

A fuel injector nozzle 430 is mounted in the combustion chamber portion 426 of the engine 424 and an oxidizer injector nozzle 432 is also mounted in the combustion chamber of closed end portion of the housing 424. The injector nozzles 430 and 432 are operatively connected to the fuel storage tank 410 and the oxidizer tank 414, respectively. In the preferred specific embodiment of the rocket of the invention as shown in FIGS. 16 and 19 the preferred means for connecting the fuel tank 410 and oxidizer tank 414 to the injector nozzles 430 and 432, respectively, is illustrated generally at 434 and includes a fuel pump 436 which is mounted in housing 402 which has a fuel inlet 438 connected to a shutoff valve 440 and the valve 440 has one end of the conduit 442 connected thereto with the other end of the conduit 442 being connected to the outlet of the fuel tank 410 and when the fuel tank shutoff valve 440 is opened fuel from tank 410 can be supplied to the pump 436. The outlet 443 of the fuel pump 436 is connected to a main fuel valve 445 which is also connected to the fuel injector nozzle 430.

An oxidizer pump 444 is mounted in the housing and has the inlet 446 thereof operatively connected to the outlet of the oxidizer storage tank 414. Preferably, the inlet 446 of the pump 444 is connected to an oxidizer tank shutoff valve 448 and one end of a conduit 450 is connected to the inlet of the valve 448 and the other end of the conduit 450 is connected to the outlet of the oxidizer storage tank 414. The outlet 452 of the oxidizer pump 444 is connected to a main oxidizer valve 454 which in turn is connected to the fuel injector nozzle 432 to provide oxidizer thereto.

Suitable means are provided to drive the fuel pump 436 and the oxidizer pump 444. In the preferred embodiment illustrated in the drawings, these pumps are driven by a gas turbine 456 which is mounted in the housing 402 and is operatively connected to the fuel pump 436 in the oxidizer pump 444 such as by a direct-coupled shaft 458 which is the main shaft of the turbine 456 and of both pumps. If desired suitable gear means or other transmission means can be provided to connect the shaft of the turbine 456 to the pumps.

Suitable means are provided to supply the turbine 456 with a gas under pressure to operate same. As illustrated in the drawings, this can be accomplished by providing a gas generator 460 which is mounted in the housing and has the outlet thereof operatively connected to the inlet of the turbine 456 to supply a gas under pressure thereto. The inlet of the gas generator 460 is operatively connected by conduits 462 and 464 to the outlets of the pumps 436 and 444 and can be mounted on the main fuel valve 445 and the main oxidizer valve 454 as illustrated in FIG. 19. Thus, when the fuel and oxidizer pumps are in operation a portion of the fuel and oxidizer are supplied to the gas generator for conversion therein to a gaseous state with the gas being discharged to the turbine 456 to drive same and thereby drive the pumps. For initial operation the pumps may be operated by other suitable means temporarily or the fuel can be supplied directly to the gas generator by separate structure, not shown. The gas passes from the turbine 456 and is discharged into a tube or conduit 466 which is connected in one end to the turbine 456 and has the downstream end portion thereof located at the exhaust end portion 406 of the engine housing 402 for discharge of gases from the turbine to the atmosphere.

Suitable control means are preferably provided to operate the valve means and control operation of the engine. When an air or gas storage tank 418 is provided, this source of gas under pressure can be utilized to operate the control mechanism. As illustrated in FIG. 19, a conduit 470 is provided and can be operatively connected to the gas storage tank 418 and has a gas pressure regulator 472 therein to regulate passage of gas therethrough. A conduit 474 is connected to the outlet of the pressure regulator 472 to receive and transmit gas under substantially constant pressure from the regulator. The gas under pressure in conduit 474 is preferably provided to the various oxidizer and fuel valves by a plurality of conduits and solenoid control valves which are electrically actuated in a predetermined sequential operation by a suitable electrical circuit, not shown. For example, control of the main oxidizer valve 454 can be provided by conduit 476 and 478 having solenoid control valve 480 and 482, respectively, therein with the valve 480 being the control for opening valve 454 and with valve 482 being operated to close valve 454 to close the valve. Conduits 484 and 486 can be connected to the conduit 474 and have solenoid control valves 488 and 490 therein, respectively, which function to open and close the oxidizer tank shutoff valve 448. In the same or similar manner, conduits, 492 and 494 can be connected to the conduit 474 and have valves 496 and 498 of the solenoid operated type in the conduits, respectively, to provide means for opening and closing the main fuel valve 445. Regulation of the fuel tank shutoff valve 440 can be provided by conduits 500 and 502 having solenoid controlled valves 504 and 506, respectively, mounted therein which function to open and close the shutoff valve 440. Means for opening and closing the gas generator valve can be provided by conduits 508 and 510 having solenoid controlled valves 512 and 514 therein.

A plurality of fluid inlet tubes 516 are preferably provided and mounted in the housing 402 and each have an inlet end portion projecting through the outer surface of the housing 402 to receive ram air from the atmosphere and the other end portion of each of the tubes 516 opens into the combustion chamber 426 of the engine 424. The tubes are preferably shaped, positioned and mounted relative to the combustion chamber to discharge air under pressure into the combustion chamber in a circular or vortex manner around the combustion chamber to provide a thermal pinch on combustion gases within the combustion chamber in the manner previously described for the other embodiments of the invention. During normal flight of the rocket 400 through atmosphere, the air conduits 516 can be used as the only source of secondary or boundary layer of air or fluid. For initial takeoff conditions and when the rocket is operated above the atmosphere, it is desirable to provide an additional source of fluid as the boundary layer around the combustion chamber. For this purpose, a conduit 518 is preferably provided and is connected in one end to the oxidizer tank 414 and is operatively connected in the other end to the tubes 516. Separate conduits 520 and 522 can be connected to a coupling member 524 in the conduit 518 and tubes 516 to provide fluid communication between the conduit 518 and the tubes 516. Preferably, the tubes 516 each have a valve 526 therein which is operable to provide oxidizer from the tank 414 to the tubes 516 or to shut off fluid flow from the tank 414 and permit ram air to pass through the tubes 516.

Magnetic means are preferably provided on the nozzle portion 428 of the engine 424 and positioned around exhaust gases passing therethrough to provide a magnetic field through which the exhaust gases must pass with the magnetic means causing further constriction of the exhaust gases passing therethrough. The magnetic means 530 desirably includes a plurality of turns of an electrical conductor passing around the outer surface of the nozzle portion 428 of the engine at the exhaust end thereof with the conductor being electrically connected to a source of electric power (not shown) so that when electricity is passed through the conductor, a magnetic field is provided which acts on the exhaust gases to constrict same.

A modified form of engine construction is illustrated in FIG. 19 where the engine is shown generally at 540 and has a closed and generally semispherical end portion 542 which defines the combustion chamber and the nozzle portion is generally cylindrical in shape and shown at 544 with the inner end portion of the nozzle portion 544 smoothly merging into the semispherical portion 542 of the engine. The air inlet tubes 516 are preferably connected in their outlet end portions to the semicylindrical portion 542 of the engine and electromagnetic means as shown at 546 surround and are connected to the outlet end of the nozzle portion 544 of the engine 540.

A still further modified construction of the engine for the rocket 400 is illustrated in FIG. 18 of the drawings wherein the engine 550 has a closed and generally bulbous shaped end portion 552 which receives the fuel injector nozzle 554 and the oxidizer injector nozzle 556. The nozzle portion 558 of the engine 550 is generally frusto-conical in shape with the narrow end portion thereof being connected to and smoothly merging into the restricted or narrow portion of the bulbous portion 552 of the engine. A plurality of air inlet tubes such as the tube 560 are provided and have the outlet end thereof connected to the bulbous portion 552 of the engine 550 to direct the flow of secondary air into the combustion chamber of the engine and the tubes 560 can extend generally upstream to the flow of combustion gases as illustrated in FIG. 18 so that the boundary layer of secondary air causes a focusing effect urging the combustion products or gases toward the focal point of the bulbous portion 552 to thereby constrict same to result in an increase in the temperature and velocity of the combustion products in the chamber. Suitable electromagnetic means 562 surround the nozzle portion 558 of the engine and in this embodiment are preferably positioned at the neck or area of reduced diameter of the nozzle portion to be most effective in constricting exhaust gases therethrough to provide a magnetic pinch on the exhaust gases and result in an increase in temperature and velocity thereof.

The following information data for a rocket engine is given by way of illustration and is not to unduly limit the scope of the invention. Considering a rocket engine which is fueled by a suitable hydrocarbon fuel and an oxidizer with the oxidizer to fuel ratio being about .75 to 7.0, combustion of the fuel takes place in the engine combustion chamber at a temperature of approximately 3000 to 10,000 degrees F. under a pressure of approximately 200 to 350 pounds per square inch. The vortex of air provided through tubes 516 has a mass flow of approximately .05 to .15 pound of air per second flowing at a rate of approximately 150 to 500 feet per second, which results in increase in the temperature and velocity of the exhaust gases leaving the combustion chamber of approximately 5 to 50 percent, the temperature being approximately 3200 to 15,000 degrees F. and the gases having a velocity of about 5000 to 12,000 feet per second. As the exhaust gases are discharged from the rocket engine they pass through a magnetic field of about 200 to 5000 gauss and the velocity of the exhaust gases is increased to approximately 5200 to 15,000 feet per second and has a temperature of about 3300 to 20,000 degrees F.

While the invention has been described in connection with preferred specific embodiment thereof it will be understood that such is intended to illustrate and not to limit the scope of the invention which is defined by the claims.

We claim:

1. A hydrocarbon combustion generated plasma turbojet engine comprising, in combination, an elongated and generally cylindrical engine housing having a frusto-conical air inlet end portion and a frusto-conical exhaust end portion, a cylindrical compressor case coaxially mounted in an upstream portion of said housing and engaging the inner end portion of said air inlet end portion of said housing to in operation receive oxygen containing air from the atmosphere, said case having a plurality of axially spaced rows of radially extending and circumferentially spaced rib-like members projecting from the inner surface thereof, an elongated turbine shaft coaxially and rotatably mounted in said housing and extending into said inlet end portion and said exhaust end portion of said housing, an elongated generally cylindrical compressor rotor coaxially mounted on said shaft within said rotor case and having a plurality of axially spaced annular rows of radially extending vanes on the radially outer surface thereof with said rows of vanes being positioned between adjacent ones of said rows of said rib-like members on said case, said vanes being circumferentially spaced apart and shaped to compress and move rearwardly atmospheric air delivered thereto through said air inlet portion of said housing during rotation of said compressor rotor, a starter motor positioned at the upstream end of said turbine shaft and operatively connected to said turbine shaft to drive said turbine shaft and said compressor when starting said engine, a streamlined motor cover supported by said housing coaxially positioned in said air inlet end portion of said housing and enclosing said starter motor, a turbine wheel mounted on said turbine shaft to turn therewith and positioned at the inner end of said exhaust end portion of said housing in spaced relation to said compressor rotor, said turbine wheel having a plurality of radially extending vanes secured to the radially outer surface thereof shaped and positioned to in operation be engaged by gases passing thereacross to cause rotation of said wheel and turn said shaft to drive said compressor rotor, a conical tail cone coaxially mounted in said exhaust portion of said housing with the apex thereof positioned downstream and with the other end portion thereof adjacent said turbine wheel, said cone and said exhaust end of said housing defining a space diverging from said turbine vanes, a plurality of air conduits mounted in said housing each having end portions which are restricted relative to the intermediate portion thereof and having one end portion positioned adjacent the outlet of said compressor vanes to receive compressed air therefrom and the other end portion of said conduits being positioned upstream of said vanes on said turbine wheel, a plurality of hollow cylinders defining combustion chambers each having a bulbous shaped end portion and tapering therefrom to a generally tubular end portion and a plurality of holes through the intermediate portion thereof, each of said air conduits having one of said cylinders positioned therein with said tubular end portion terminating upstream of the downstream end of said cylinders and with the bulbous end portion positioned intermediate said end portions of said conduits and with the major portion of said cylinders being spaced from said conduits to provide a path for secondary air so that in operation a major portion of the air in said conduits can pass through said holes in said cylinders to provide primary air for mixing with fuel in said cylinders and secondary air can pass around said cylinders for mixing with the exhaust gases from said cylinders prior to being exhausted from said air conduits, said tubular end portions of said each of said cylinders having a plurality of ribbons spirally mounted along the outer surface thereof and engaging the inner surface of said air conduits to in operation spiral secondary air passing therealong and create a turbulence at the exhaust end of said cylinders resulting in a thermal pinch of exhaust gases leaving said cylinders due to the difference in electrical conductivity of the exhaust gases and the secondary air, a plurality of fuel spray nozzles, each of said cylinders having an end portion of one of said nozzles mounted in said bulbous portion of said cylinders and operatively connected in the other end portion to a fuel supply, fuel ignition means with each of said cylinders to ignite fuel therein, a plurality of electromagnetic means each comprising a plurality of turns of an electrical conductor, the other end portion of each of said air conduits having one of said electromagnetic means mounted thereon and positioned downstream relative to said tubular end portion of said cylinder within said air conduit, said electromagnetic means being operatively connected to a source of electric power to apply a magnetic pinch to exhaust gases discharged at said tubular end portion of said cylinders to cause constriction of the exhaust gases immediately prior to passing of same through said vanes on said turbine wheel, said engine being constructed and adapted so that ram air entering said inlet end portion of said engine housing is compressed by said vanes in said compressor and discharged therefrom to said air conduits with a major portion of said compressed air passing through said holes in said cylinders into said combustion chambers therein and with a minor portion of said compressed air passing around said cylinders and being discharged as secondary air downstream of said tubular exhaust end portion of said cylinders and spiraled by said ribbons on said cylinders to cause turbulence at the downstream end portion of said cylinders, and with fuel being supplied to said combustion chambers for mixture therein with said primary air and ignition therein by said means to ignite fuel therein to cause combustion of said fuel and an increase in the temperature of said fuel and primary air mixture resulting in ionization of a portion thereof, said exhaust gases being discharged from said cylinder coaxially of said secondary air with said exhaust gases being hot relative to said secondary air and resulting in an electrical conductivity differential between said exhaust gases and said secondary air and resulting in a thermal pinch of said exhaust gases to increase the temperature and velocity thereof and with said electromagnetic means inducing an electromagnetic pinch downstream of said thermal pinch to thereby further increase the temperature and velocity of said exhaust gases with said exhaust gases then passing through said vanes on said turbine wheel to cause rotation thereof and of said turbine shaft to thereby turn said compressor rotor, said exhaust gases passing through said exhaust end portion of said housing to the atmosphere to produce thrust.

2. The engine as defined in claim 1 additionally comprising, a plurality of air tubes mounted in said exhaust end portion of said engine housing, each having the inlet end portion thereof positioned at the outer surface of said housing to receive ram air from the atmosphere and with the outlet end portion of said tubes opening into said exhaust end portion of said engine housing downstream of said turbine wheel, each of said tubes being shaped and positioned to discharge ram air from the atmosphere into the exhaust gases from said turbine wheel in a direction substantially perpendicular to the direction of movement of said exhaust gases and substantially tangent to the surface of said exhaust end portion of said engine housing to thereby create additional turbulence in said exhaust gases and provide a boundary layer of ram air which is cool relative to the exhaust gases to thereby produce a second thermal pinch resulting in an increase in velocity and temperature of said exhaust gases, valve means in each of said tubes to regulate the volume of air passing therethrough, and additional electromagnetic means at the downstream end of said exhaust end portion of said engine housing surrounding said exhaust gases and positioned downstream from said air tubes with said last-named electromagnetic means being operatively connected to a source of electric power and in operation causing an electromagnetic pinch of the exhaust gases at said downstream end of said exhaust end portion of said engine housing to further increase the velocity and temperature of said exhaust gases.

3. The engine as defined in claim 1 additionally comprising, an elongated shroud coaxially positioned around said exhaust end portion of said engine housing with the downstream end of said shroud being downstream of said exhaust end of said housing and with the upstream end of said shroud being upstream of said exhaust end of said housing, said upstream end of said shroud being larger in diameter than the portion of said engine housing immediately radially inwardly therefrom to thereby provide an annular space to receive ram air from the atmosphere, a plurality of elongated metallic ribbons secured in their edge portions to said exhaust end portion of said engine housing and to the inner surface of said shroud with said ribbons extending in a helical direction relative to the axis of said housing to thereby cause ram air received in said space between said shroud and said housing in operation to be directed in a helically inwardly moving path as said ram air moves rearwardly through said shroud with the ram air spirally surrounding the hot exhaust gases leaving said engine housing resulting in an electrical conductivity differential between the hot ionized exhaust gases and the relatively cool ram air to thereby cause a thermal pinch of said exhaust gases from said engine housing causing an increase in temperature and velocity thereof, and electromagnetic means at said downstream end of said shroud operatively connected to a source of electric power to provide a magnetic pinch on said exhaust gases downstream of said last-named thermal pinch to thereby result in a further increase in temperature and velocity of said exhaust gases leaving said shroud.

4. A hydrocarbon combustion generated plasma jet engine comprising, in combination, an elongated engine housing having an air inlet portion and a exhaust end portion, an elongated turbine shaft coaxially and rotatably mounted in said housing, an air compressor mounted on one end of said turbine shaft and positioned to receive air through said air inlet end portion of said housing to compress same, a turbine wheel mounted on the other end portion of said turbine shaft to turn therewith and positioned at said exhaust end portion of said housing in spaced relation to said compressor, a plurality of air conduits mounted in said housing each having end portions positioned adjacent the outlet of said compressor and adjacent the inlet of said turbine wheel, a plurality of hollow cylinders defining combustion chambers each having a bulbous shaped end portion and being open at the other end portion and having a plurality of holes through the intermediate portion thereof, each of said air conduits having one of said cylinders positioned therein with said open end portion thereof terminating upstream of the downstream end portion of said cylinders and with the major portion of the outer surface of said cylinders being spaced from the inner surface of said conduits to provide a path for secondary air around said cylinders so that in operation a major portion of the air in said conduits can pass through said holes into said cylinders to provide primary air for mixing with fuel in said cylinders and secondary air can pass around said cylinders for mixing with the exhaust gases from said cylinders prior to being exhausted from said air conduits, the outer surface of said open end portions of each of said cylinders having a plurality of ribbons spirally mounted along the outer surface thereof and engaging the inner surface of said air conduits to in operation spiral secondary air passing therealong and create a turbulence at the exhaust end of said cylinders resulting in a thermal pinch of exhaust gases leaving said cylinders due to the difference in electrical conductivity of the hot exhaust gases and the relatively cool secondary air, a plurality of fuel spray nozzles, each of said cylinders having one of said nozzles operatively connected thereto and to a fuel supply to supply fuel to said cylinders for combustion therein, ignition means with each of said cylinders to ignite fuel therein, electromagnetic means mounted on the other end portion of each of said conduits and positioned downstream relative to said open end portion of said cylinders within said conduits, said electromagnetic means being operatively connected to a source of electric power to apply a magnetic pinch to exhaust gases discharged at said open end of said cylinders to cause additional pinching of the exhaust gases, said engine being constructed and adapted so that ram air entering said inlet end portion of said engine housing is compressed by said compressor therein with said air being discharged to said conduits, and into said cylinders through said holes therein with a portion of said air passing around said cylinders and being spiraled by said ribbons on said cylinders, and with fuel being supplied to said combustion chambers for mixture therein with said primary air and ignition therein and with the resulting exhaust gases being discharged from said cylinders and restricted as a result of the thermal pinch caused by said second air, and further restricted by said electromagnetic means to thereby increase the temperature and velocity of said exhaust gases.

5. A hydrocarbon combustion generated plasma jet engine comprising, in combination, an elongated and generally cylindrical engine housing having a frusto-conical air inlet end portion and a frusto-conical exhaust end portion, a cylindrical compressor case coaxially mounted in an upstream portion of said housing and engaging the inner end portion of said air inlet end portion of said housing to receive oxygen containing air from the atmosphere, said case having a plurality of axially spaced rows of radially extending and circumferentially spaced rib-like members projecting from the inner surface thereof, an elongated turbine shaft coaxially and rotatably mounted in said housing and extending into said inlet end portion and said exhaust end portion of said housing, an elongated generally cylindrical compressor rotor coaxially mounted on said shaft within said rotor case and having a plurality of axially spaced annular rows of radially extending vanes on the radially outer surface thereof with said rows of vanes being positioned between adjacent ones of said rows of said rib-like members on said case, said vanes being circumferentially spaced apart and shaped to compress and move rearwardly atmospheric air delivered thereto through said air inlet end portion of said housing during rotation of said compressor rotor, a starter motor positioned at the upstream end of said turbine shaft and operatively connected to said turbine shaft to drive said turbine shaft and said compressor when starting said engine, a streamlined motor cover supported by said turbine shaft coaxially positioned in said air inlet end portion of said housing and enclosing said starter motor, a turbine wheel mounted on said turbine shaft to turn therewith and positioned at the inner end of said exhaust end portion of said housing in spaced relation to said compressor rotor, said turbine wheel having a plurality of radially extending vanes secured to the radially outer surface thereof shaped and positioned to in operation be engaged by gases passing thereacross to cause rotation of said wheel and turn said shaft to drive said compressor rotor, a tail cone coaxially mounted in said exhaust portion of said housing with the apex thereof positioned at the downstream end thereof and with the other end portion thereof adjacent said turbine wheel, said cone and said exhaust end of said housing defining a space diverging from said turbine vanes, a plurality of air conduits mounted in said housing each having end portions which are restricted relative to the intermediate portion thereof and having one end portion positioned adjacent the outlet of said compressor vanes to receive compressed air therefrom and the other end portion of said conduits being positioned upstream of said vanes on said turbine wheel, a plurality of hollow cylinders defining combustion chambers each having a bulbous shaped end portion and tapering therefrom to a generally tubular end portion and a plurality of holes through the intermediate portions thereof with the axis of said holes being inclined circumferentially relative to a radius therethrough, each of said air conduits having one of said cylinders positioned therein with said tubular end portion terminating downstream of the downstream end of said cylinders and with said bulbous end portion positioned intermediate said end portions of said conduits and with said downstream end portion of each of said air conduits snugly engaging an intermediate portion of each of said cylinders to prevent passage of air therebetween to thereby cause air received by said air conduits to be passed through said cylinders an discharged therefrom with air passing through said holes in said cylinders being twisted in a helical manner to provide a vortex of air as a result of the angle of inclination of said holes in said cylinders, a plurality of fuel spray nozzles, each of said cylinders having an end portion of one of said nozzles mounted in said bulbous end portion of said cylinders and operatively connected in the other end portion to a fuel supply, a plurality of ribbons connected to each of said fuel spray nozzles adjacent the outer surface of said cylinders with said ribbons being shaped and positioned in said air conduits to cause air passing thereacross to be turned in a helical manner for discharge through said holes in said cylinders, fuel ignition means with each of said cylinders to ignite fuel therein, a plurality of electromagnetic means each comprising a plurality of turns of an electrical conductor, said tubular end portions of each of said cylinders having one of said electromagnetic means mounted thereon and positioned downstream of said air conduit, said electromagnetic means being operatively connected to a source of electric power to apply a magnetic pinch to exhaust gases passing from said cylinders to cause restriction thereof and a resulting increase in temperature and velocity of said gases immediately prior to passing of same through said vanes on said turbine wheel, said engine being constructed and adapted so that ram air entering said inlet end portion of said engine housing is compressed by said vanes in said compressor and discharged therefrom to said air conduits with said air being swirled by said ribbons on said fuel inlet nozzles and with said air passing through said holes in said cylinders into said combustion chambers therein for mixing with fuel from said fuel nozzles and combustion therein and with the exhaust gases of the combustion passing through said tubular end portion of said cylinders and restricted as a result of said electromagnetic means to increase the temperature of said exhaust resulting in further ionization thereof and an increase in velocity of said gases.

6. A hydrocarbon combustion generated plasma jet engine, comprising, in combination, an elongated engine housing having an air inlet end portion and an exhaust end portion, an elongated turbine shaft coaxially and rotatably mounted in said housing, an air compressor mounted on one end of said turbine shaft and positioned to receive air through said air inlet portion of said housing to compress same, a turbine wheel mounted on the other end portion of said turbine shaft to turn therewith and positioned at said exhaust end portion of said housing in spaced relation to said compressor, a plurality of air conduits mounted in said housing each having end portions positioned adjacent the outlet of said compressor and adjacent the inlet of said turbine wheel, a plurality of hollow cylinders defining combustion chambers each having a bulbous shaped end portion and being opened at the other end portion and having a plurality of holes through the intermediate portion thereof inclined at an angle, each of said air conduits having one of said cylinders positioned therein with said open end portion of said cylinders terminating downstream of the downstream end portion of said conduits and with said downstream end portion of said conduits tightly gripping the outer surface of the intermediate portion of said cylinders, a plurality of fuel spray nozzles, each of said cylinders having one of said nozzles operatively connected thereto and to a fuel supply to supply fuel to said cylinders for combustion therein, means to ignite said fuel in said cylinders, ribbon means mounted in said air conduits upstream of said cylinders and shaped and mounted to cause rotation of air passing thereacross in a helical manner, electromagnetic means mounted on the open end portion of each of said cylinders and positioned downstream of said conduits, said electromagnetic means being operatively connected to a source of electric power to apply a magnetic pinch to exhaust gases discharged from said cylinders, said engine being constructed and adapted so that ram air entering said inlet end portion of said engine housing is compressed by said compressor therein with said air being discharged to said conduits and into said cylinders through said holes therein and spiraled by said ribbons in said conduits, and with fuel being supplied to said combustion chambers for mixture therein with said primary air and ignition therein and with the resulting exhaust gases being discharged from said cylinders and with said electromagnetic means causing restriction of said gases to thereby increase the temperature and velocity thereof.

7. A plasma jet engine comprising, in combination, an engine housing having an air inlet end portion and an exhaust end portion, a compressor mounted in said housing at said air inlet end portion thereof and operable to receive and compress air received thereby, a turbine mounted at said exhaust end portion of said housing and operatively connected to said compressor, conduit means mounted in said housing between said compressor and said turbine, means in said conduit means defining combustion chambers, said conduit means conducting spiraling air to said combustion chambers, said combustion chambers having portions thereof in fluid communication with said conduit means to receive the spiraling air therefrom, fuel supply means operatively connected to said combustion chambers, electromagnetic means mounted in said housing and positioned around the exhaust gases from said combustion chambers and operable to cause a constriction of the exhaust gases, said engine being constructed and adapted so that ram air entering said engine housing can be compressed by said compressor therein with said air being discharged to said conduit means and into said combustion chamber for mixing therein with fuel supplied thereto; and with said fuel being ignited in said combustion chambers and the resulting exhaust gases being discharged from said combustion chambers and pinched as a result of operation of said electromagnetic means.

8. A hydrocarbon combustion generated plasma ramjet engine comprising, in combination, an elongated and generally cylindrical engine housing having an open air inlet end portion and an open exhaust end portion, a power accessories housing mounted in said inlet end portion of said engine housing, said power accessories housing being of a streamlined configuration and having a forward end portion projecting from said engine housing and being pointed at the forward end thereof and having a downstream end portion tapering to an apex with the center portion of said power accessories housing being enlarged relative to said end portions and generally tubular and smoothly merging into said end portions, said forward end portion of said power accessories housing defining a supersonic diffuser with an intermediate portion of said housing and said engine housing defining a subsonic diffuser and in operation comprising air passing therethrough, supports connected to said engine housing and said power accessories housing to mount said power accessories housing in said engine housing, fuel supply means in said power accessories housing, an annular fuel manifold mounted on an intermediate portion of said power accessories housing and operatively connected to said fuel supply means to receive fuel therefrom and discharge the fuel into said engine housing, a flame holder positioned in said engine housing immediately downstream from said apex of said power accessories housing, said flame holder including an annular outer member coaxially positioned in said engine housing and having a network of open rectangular baffles secured thereto and substantially extending across said outer member, a plurality of radially extending ribbons secured to the inner surface of said engine housing and secured to the outer surface of said annular member of said flame holder to thereby mount said flame holder in said housing, said ribbons being elongated and extending longitudinally along said engine housing with the surfaces of said ribbons being inclined relative to a plane passing through the axis of said engine housing to in operation create a boundary layer of helically moving fluid around the fluid passing through said flame holder, a combustion chamber in said engine housing immediately downstream of said flame holder, and electromagnetic means mounted on said outlet end portion of said engine housing and including a coil of an electrical conductor operatively connected to a source of electric power, said engine being constructed and adapted to receive air from the atmosphere through said inlet end portion of said engine housing and diffuse and compress same with said air being mixed with fuel supplied to said engine housing by said fuel manifold and with said fuel and air mixture passing through said flame holder for combustion downstream thereof in said combustion chamber and with a portion of the fuel-air mixture passing through said ribbons mounted on said flame holder to be spiraled around the combustion chamber to cause an inwardly directed force and constriction of the resulting combustion products and with said electromagnetic means causing further constriction of the exhaust gases passing therethrough.

9. A hydrocarbon combustion generated plasma ramjet engine, comprising, in combination, an elongated engine housing having an open air inlet end portion and an open exhaust end portion, air diffuser means mounted in said air inlet end portion of said housing and having a streamlined configuration with end portions tapering to apexes, support means connected to said engine housing and said air diffuser means to mount said air diffuser means in said housing, a fuel manifold positioned in said engine housing and operatively connected to a source of fuel to in operation provide a fuel to said engine housing downstream of said air diffuser means, a flame holder mounted in said engine housing and positioned downstream of said fuel manifold, mounting means for said flame holder connected to said engine housing and to said flame holder and being shaped and positioned around said flame holder to provide a boundary layer of fluid and to cause said boundary layer to be spiraled in operation, a combustion chamber in said engine housing downstream of said flame holder to receive and burn fuel from said fuel manifold, said boundary layer of fluid passing around the circumference of said combustion chamber to in operation constrict the resulting combustion products, and electromagnetic means mounted on the exhaust end portion of said housing and operatively connected to a source of electric power to in operation provide a magnetic pinch on exhaust gases passing therethrough, said engine being constructed and adapted to receive ram air through said open air inlet end portion of said housing with said air being diffused and compressed by said air diffuser means in said housing and with fuel being supplied to said housing through said fuel manifold passing through said flame holder for combustion in said combustion chamber while secondary fluid passes around said flame holder and surrounds the resulting combustion products in said combustion chamber, the exhaust gases from said combustion chamber passing through said exhaust end portion of said housing and being constricted by operation of said electromagnetic means.

10. A hydrocarbon combustion plasma engine comprising, in combination, a housing having an air inlet portion and an open exhaust portion, fuel manifold means mounted in said engine housing, flame holder means positioned in said housing and connected thereto and positioned downstream of said fuel manifold, a combustion chamber in said housing downstream of said flame holder to receive fuel from said fuel manifold and burn same therein, fluid deflector means in said housing positioned relative to said combustion chamber to provide a vortex or fluid around said combustion chamber and create a thermal pinch on the combustion products resulting from burning of fuel in said combustion chamber, and electromagnetic means mounted on said exhaust portion of said housing and surrounding exhaust gases passing therethrough with said electromagnetic means being operatively connected to a source of electric power to in operation create an electromagnetic pinch on the exhaust gases passing therethrough and cause constriction thereof, said engine being constructed and adapted to receive air through said air inlet portion of said engine housing and mix a portion of same with fuel entering said housing through said fuel manifold with the fuel being burned in said combustion chamber and with secondary air around said combustion chamber causing a thermal pinch on the resulting combustion products and with exhaust gases from said combustion chamber passing through said exhaust portion thereof, said electromagnetic means causing a magnetic pinch on said exhaust gases to constrict same prior to being discharged from said engine housing.

11. A hydrocarbon combustion generated plasma pulse jet engine comprising, in combination, an elongated and generally cylindrical engine housing having an open air inlet end portion and an open exhaust end portion, an annular fuel manifold positioned in said air inlet end portion of said housing and having a plurality of nozzle openings therein to in operation provide fuel into said housing, a plurality of supports connected to said manifold and said housing to coaxially mount said manifold in said housing, fuel conduit means connected to said manifold and to a source of fuel, a valve bank mounted in said housing adjacent and downstream from said manifold, said valve bank including a plurality of spaced and fixed ribs and a plurality of flexible metal strips each connected in an upstream end portion to said ribs with the other end portion of said strips being normally positioned to close said valve bank and with said strips being moved to an open position by ram air passing thereacross from the upstream to the downstream edge thereof, a combustion chamber in said housing immediately downstream of said valve bank, fuel ignition means in said combustion chamber operable to ignite fuel therein with ignition of fuel in said combustion chamber causing a back pressure at said valve bank to close said metal strips and said valve bank, a plurality of air tubes mounted in said exhaust end portion of said housing each having the inlet end portion thereof positioned at the outer surface of said housing to receive ram air from the atmosphere and with the outlet end portion of said tubes opening into said exhaust end portion of said engine housing downstream of said combustion chamber, adjustable valve means mounted in said air tubes and operable to regulate the flow of air therethrough, each of said tubes being shaped and positioned to discharge ram air from the atmosphere into the exhaust gases from said combustion chamber in a direction substantially perpendicular to the direction of movement of said exhaust gases and substantially tangent to the surface of said exhaust end portion of said engine housing to thereby constrict the exhaust gases and result in an increase in temperature and velocity of said exhaust gases, and electromagnetic means connected to said housing and positioned downstream of said air tubes and receiving the exhaust gases from said combustion chamber with said electromagnetic means being operatively connected to a source of electric power to in operation cause an electromagnetic pinch of the exhaust gases at the downstream end of said exhaust end portion of said housing and thereby further increase the temperature and velocity of said exhaust gases.

12. A hydrocarbon combustion generated plasma pulse jet engine, comprising, in combination, an elongated housing having an open air inlet portion to receive ram air and an open exhaust end portion, a fuel manifold mounted in said air inlet end portion of said housing and operatively connected to said source of fuel to provide fuel to said housing, valve means mounted in said housing adjacent and downstream of said fuel manifold and operable to open on ram pressure to pass fuel and air therethrough and closeable by back pressure caused by combustion of said fuel downstream from said valve bank, a combustion chamber downstream of said valve bank having ignition means therein operable to ignite a fuel therein, means defining an air passageway connected in one end portion to said exhaust end portion of said housing and having the other end portion positioned to in operation receive ram air and to provide ram air into said housing spirally around exhaust gases from said combustion chamber to cause a constriction of said exhaust gases, and electromagnetic means mounted in said exhaust end portion of said housing and located downstream of said air passageway means, said electromagnetic means being operatively connected to a source of electric power to in operation cause constriction of the exhaust gases passing therethrough, said engine being constructed and adapted to receive ram air through said air inlet portion of said housing and to mix same with fuel supplied to said housing through said fuel manifold with said fuel and air passing through said valve means into said combustion chamber for combustion therein, the resulting exhaust gases passing through said exhaust end portion of said housing and being constricted by said air from said passageway and said electromagnetic means to thereby increase the temperature and velocity of said gases.

13. A hydrocarbon combustion generated plasma rocket comprising, in combination, an elongated and generally cylindrical rocket housing having a closed and streamlined nose end portion and being open at the exhaust end portion, said housing being streamlined on the outer surface thereof and having a plurality of fins mounted on the outer surface thereof at said exhaust end portion thereof, an elongated fuel tank mounted in an intermediate portion of said housing, an elongated oxidizer tank mounted in said housing and positioned between said fuel tank and said nose end portion of said housing, a gas storage tank for pressurized gas mounted in said nose end portion of said housing and operatively connected to said oxidizer tank and said fuel tank to in operation provide a gas under pressure thereto, a rocket engine mounted in said housing at said exhaust end portion thereof and having a combustion chamber therein opening directly into an unobstructed nozzle portion with the outlet end of said nozzle portion being positioned at said exhaust end portion of said housing to discharge exhaust gases to the atmosphere through said nozzle, fuel and oxidizer injector nozzles mounted in said engine and positioned to provide fuel and oxidizer to said combustion chamber, a fuel pump mounted in said housing and having the inlet end thereof operatively connected to the outlet of said fuel tank and with the outlet of said pump being operatively connected to said fuel injector nozzle, an oxidizer pump mounted in said housing and having the inlet thereof operatively connected to the outlet of said oxidizer tank and having the outlet of said oxidizer pump operatively connected to said oxidizer injector nozzles, a turbine mounted in said housing and operatively connected to said fuel pump and said oxidizer pump to drive same, a gas generator positioned in said housing and having the outlet thereof connected to the inlet of said turbine, the inlet of said gas generator being operatively connected to the outlet of said fuel pump and said oxidizer pump to in operation receive fuel and oxidizer therefrom and convert same to a gas therein to thereby provide a gas to said turbine to turn same, a turbine exhaust conduit connected to the outlet of said turbine and positioned at said outlet end portion of said housing to discharge gases from said turbine to the atmosphere, gas operated control means operatively connected to said gas storage tank and to said gas generator and said inlets and outlets of said pumps and operable to regulate flow of fuel and oxidizer to said engine in operation, a plurality of air inlet tubes mounted in said housing and having an inlet end thereof projecting through said housing to receive ram air from the atmosphere with the other end portion of said tubes opening into said combustion chamber of said engine and with said tubes being shaped and positioned relative to said combustion chamber to discharge air into said chamber spirally around said combustion chamber, conduit means connected to said oxidizer tank and to said tubes and having valve means therein operable to provide oxidizer from said tank to said tubes when said rocket is above the atmosphere and during take off of said rocket, and electromagnetic means including a plurality of turns of an electrical conductor mounted on said nozzle portion of said engine at the exhaust end portion of said housing and electrically connected to a source of electric power with said electromagnetic means in operation providing an electromagnetic pinch on the exhaust gases passing therethrough, said rocket being constructed and adapted to receive and store fuel in said fuel tank and oxidizer in said oxidizer tank and a gas in said gas storage tank with said fuel and oxidizer being provided to said engine for combustion therein and with a fluid from said tubes being received in said combustion chamber and passing around combustion gases therein to provide a boundary layer of relatively cool air to cause constriction of the exhaust gases resulting from combustion of said fuel therein, the resulting exhaust gases discharged through said nozzle portion of said engine with said electromagnetic means causing a further constriction of said gases and a resulting increase in temperature and velocity thereof.

14. The rocket as defined in claim 13 wherein said engine has a bulbous shaped combustion chamber with the outlet thereof being restricted and wherein said nozzle portion of said engine is frusto-conical in shape and flares outwardly from said restricted portion of said combustion chamber.

15. The rocket as defined in claim 13 wherein said combustion chamber has a closed and generally semi-cylindrical end and wherein said nozzle portion of said engine is generally cylindrical in shape and smoothly merges into said combustion chamber.

16. The rocket as defined in claim 13 wherein said combustion chamber of said engine is closed at the inner end thereof and diverges outwardly therefrom and wherein said nozzle portion of said engine is frusto-conical in shape and smoothly merges into said combustion chamber.

17. A rocket comprising, in combination, an elongated housing having a closed and streamlined nose end portion and an open exhaust end portion, a fuel tank mounted in said housing, an oxidizer tank mounted in said housing, a storage tank for pressurized gas mounted in said housing and operatively connected to said fuel tank and said oxidizer tank to in operation maintain same under pressure, a rocket engine having a combustion chamber and a nozzle portion with said engine being mounted in said housing with the outermost end of said nozzle portion being positioned at said exhaust end portion of said housing to discharge exhaust gases from said engine to the atmosphere, a plurality of fuel and oxidizer nozzles mounted in said combustion chamber of said engine, a fuel pump mounted in said housing and operatively connected to said nozzles, the inlet of said fuel pump being operatively connected to the outlet of said fuel tank, an oxidizer pump mounted in said housing and having the inlet thereof operatively connected to said oxidizer tank and having the outlet thereof operatively connected to said nozzles in said engine, a turbine mounted in said housing and having the outlet thereof connected to one end of a turbine exhaust with the other end of said tube positioned at said exhaust end portion of said housing to discharge gases from said turbine to the atmosphere, a gas generator mounted in said housing and having the inlet thereof operatively connected to the outlets of said fuel pump and said oxidizer pump to receive fuel and oxidizer therefrom and having the outlet thereof operatively connected to the inlet of said turbine to provide gas thereto, said turbine being operatively connected to said oxidizer pump and said fuel pump to drive same in operation, fluid conduit means mounted in said housing and having one end thereof passing through said housing to receive air from the atmosphere with the other end thereof opening into said combustion chamber of said engine and with said fluid conduit means being constructed and shaped to discharge air into said combustion chamber spirally around said combustion chamber, electromagnetic means mounted on said nozzle portion of said engine and including a conductor eccentrically coiled around said nozzle portion at the downstream end of said nozzle portion and operatively connected to a source of electric power with said electromagnetic means causing constriction of exhaust gases passing therethrough, said rocket being constructed and adapted to receive fuel in said fuel tank and oxidizer in said oxidizer tank with a gas under pressure in said gas storage tank and with fuel and oxidizer being supplied to said engine by said fuel pump and said oxidizer pump for combustion therein and with secondary air being provided through said conduit means to said combustion chamber to provide a boundary layer of cool air around the combustion gases therein to cause a constriction of the combustion gases and with said electromagnetic means further constricting exhaust gases passing therethrough.

18. A rocket comprising, in combination, a housing having an open exhaust end portion, a tank means mounted in said housing and constructed to receive and store a combustible fuel, a rocket combustion chamber mounted in said housing and operatively connected to said tank means to receive fuel therefrom in operation, means connected to said combustion chamber and operable to receive a fluid and provide same spirally to said combustion chamber, electromagnetic means mounted on said combustion chamber at a downstream portion thereof and electrically connectible to a source of electric power to provide a magnetic pinch to exhaust gases passing therethrough, said rocket being constructed and adapted to receive fuel in said fuel storage means and supply same to said combustion chamber for combustion therein with secondary fluid being provided to said combustion chamber to provide a thermal pinch to combustion products of said combustion chamber and with said electromagnetic means providing an electromagnetic pinch to exhaust gases passing therethrough.

19. The method of producing thrust comprising the steps of, passing air at substantially atmospheric temperature and pressure into a compressor and compressing same to result in an increase in the pressure of the air to 4 to 6 atmospheres of pressure and an increase in the temperature of the air to 700 to 900 degrees R., discharging the air from the compressor at a velocity of 250 to 500 feet per second into an air conduit, passing a major portion of the air into a combustion chamber in the conduit, mixing fuel with the air in the combustion chamber to provide a combustible mixture of fuel and air, burning the fuel in the combustion chamber with the pressure of the resulting exhaust gases being 3 to 5 atmospheres of pressure and with the temperature in the combustion chamber being increased to 1400 to 3000 degrees R. as a result of combustion of fuel therein, by-passing a minor portion of the air around the combustion chamber and turning same to provide a vortex of swirling air around the exhaust gases discharged from the combustion chamber with the vortex having a mass flow of .05 to .15 pound of air per second at a velocity of 150 to 500 feet per second and with said vortex of air causing constriction of the exhaust gases to increase the velocity and temperature of the exhaust gases to a velocity of 250 to 500 feet per second at a temperature of 1500 to 4000 degrees R., passing the exhaust gases through an annular magnetic field of 200 to 5000 gauss to increase the temperature to 1600 to 4500 degrees R. and the velocity to 275 to 750 feet per second, passing the exhaust gases through a turbine to result in a decrease in the temperature to 1400 to 3000 degrees R. and an increase in the velocity to approximately 400 to 1500 feet per second, and discharging the exhaust gases to the atmosphere.

20. The method of producing thrust comprising the steps of, compressing atmospheric air and passing a major portion of the compressed air into a combustion chamber, mixing a combustible fuel with the compressed air in the combustion chamber to provide a combustible mixture of fuel and air, burning the resulting mixture of fuel and air in the combustion chamber and passing the resulting exhaust gases from the combustion chamber, passing a minor portion of the compressed air around the combustion chamber and turning same to provide a vortex of secondary air, directing the vortex of air around the exhaust gases leaving the combustion chamber with the vortex of air having an inwardly directed component of force causing constriction of the exhaust gases to result in an increase in the temperature and velocity thereof, and passing the exhaust gases through an annular magnetic field to cause further constriction thereof and result in a further increase in the temperature and velocity of the exhaust gases, and passing the exhaust gases to the atmosphere.

21. A method of producing thrust comprising the steps of, compressing air, passing the compressed air into an air tube containing a combustion chamber, passing a portion of the air into the combustion chamber, mixing fuel with the compressed air in the combustion chamber, burning the fuel in the combustion chamber and discharging the resulting exhaust gases therefrom through a nozzle, providing a vortex of air around the exhaust gases to cause the constriction of the exhaust gases at the nozzle, and further passing the exhaust gases through a magnetic field to cause further constriction of the exhaust gases at the nozzle, and passing the exhaust gases from the nozzle to the atmosphere.

22. The method of producing thrust comprising the steps of, passing air from the atmosphere into an engine housing and through a supersonic diffuser to increase the pressure thereof to 2 to 4 atmospheres and through a subsonic diffuser to increase the pressure thereof to 3 to 6 atmospheres, resulting in an increase in the temperature of the air to 550 to 1500 degrees R. and increasing the velocity of the air to 125 to 175 feet per second, mixing a combustible fuel with a major portion of the air to provide a combustible fuel-air ratio and passing the resulting mixture into a combustion chamber while simultaneously turning a minor portion of the air to provide a vortex of air and directing the vortex around the combustion chamber with the vortex having a mass flow of .05 to .15 pound of air per second and flow at a velocity of 150 to 500 feet per second, burning the fuel in the combustion chamber with the resulting exhaust gases being constricted by the surrounding vortex to increase the temperature and velocity of the exhaust gases to 300 to 500 feet per second and 1500 to 3000 degrees R., passing the exhaust gases through an annular magnetic field of 200 to 5000 gauss to further constrict the exhaust gases to increase the velocity and temperature of the exhaust gases to 700 to 1000 feet per second and 1500 to 3500 degrees R., and discharging the exhaust gases to the atmosphere.

23. A method of producing thrust comprising the steps of, compressing air from the atmosphere, mixing a portion of the air with a combustible fuel and transferring same with the air to provide a combustible mixture of air to provide a vortex of air and directing same around the combustion chamber, burning the fuel in the combustion chamber with the vortex of air causing constriction of the resulting exhaust gases, passing the exhaust gases through a magnetic field to cause further constriction thereof, and discharging the exhaust gases to the atmosphere.

24. A method of producing thrust comprising the steps of, passing air at atmospheric pressure into an engine housing, providing fuel to the engine housing and mixing same with the air to provide a combustible mixture of fuel and air, transferring the resulting fuel-air mixture through a valve bank into a combustion chamber and burning the fuel therein to result in a pressure in the combustion chamber of 2 to 3 atmospheres and a temperature of 1500 to 3000 degrees R., and with the pressure in the combustion chamber closing the valve bank, providing a vortex of air around the resulting exhaust gases with the vortex of air having a mass flow of .05 to .15 pound per second at a velocity of 150 to 500 feet per second, the vortex of air having an inwardly directed component and causing constriction of the exhaust gases to increase the temperature thereof to 1600 to 4500 degrees R. and increase the velocity of the exhaust gases to 400 to 750 feet per second, passing the exhaust gases through an annular magnetic field of 200 to 5000 gauss to further increase the temperature and velocity thereof, discharging the resulting exhaust gases from the engine housing, passage of the exhaust gases from the combustion chamber resulting in a decrease in pressure therein to permit opening of the valve bank and admitting additional fuel and air into the combustion chamber.

25. The method of producing thrust comprising the steps of, passing air into an engine housing, providing a fuel to the engine housing and mixing same with air therein, burning the fuel in a combustion chamber to increase the temperature and pressure thereof with ignition of the fuel creating a pressure and preventing passage of additional fuel into the combustion chamber, providing a vortex of secondary air around the exhaust gases to constrict same and increase the temperature and velocity thereof, passing the exhaust gases through a magnetic field to further constrict same, and discharging the exhaust gases from the engine housing with discharge of the exhaust gases decreasing the pressure in the engine housing to permit passage of additional fuel and air therethrough.

26. The method of producing thrust for a rocket or the like comprising the steps of, providing liquid fuel and oxidizer from storage means to a gas generator, converting the liquid fuel and oxidizer in the generator to a gaseous state, transferring the resulting gas under pressure to a turbine to rotate same, using the turbine to drive fuel and oxidizer pumps with the pumps transferring fuel and oxidizer from storage means to injector nozzles in an engine, mixing the fuel and oxidizer in a combustible mixture and burning same in the engine at a temperature of 3000 to 10,000 degrees F., surrounding the burning fuel and oxidizer with a spiraling gaseous fluid, a mass flow of .05 to .15 pound at a velocity of 150 to 500 feet per second and having an inwardly directed component of force to constrict the resulting exhaust gases and result in an increase in temperature and velocity thereof, passing the exhaust gases through a magnetic field of 200 to 5000 gauss with the magnetic field causing constriction of the exhaust gases to result in an increase in temperature to 3300 to 20,000 degrees F. and an increase in velocity to 5200 to 15,000 feet per second, and discharging the exhaust gases from the engine.

27. The method of producing thrust for a rocket or the like comprising the steps of, providing a combustible mixture of fuel and oxidizer to a combustion chamber of a rocket engine or the like, burning the fuel in the combustion chamber, surrounding the resulting exhaust gases with a fluid vortex having an inwardly directed component of force to cause constriction of the exhaust gases, passing the resulting exhaust gases through a magnetic field to cause further constriction thereof and result in an increase in the temperature and velocity thereof, and discharging the exhaust gases from the engine.

28. The method of producing thrust comprising, the steps of, providing a fuel and an oxidizer to a combustion chamber, igniting the fuel and oxidizer, introducing and passing a fluid spirally around and into contact with resulting combustion products and constricting said resulting combustion products, establishing a magnetic field and further constricting the resulting combustion products by passing the combustion products through said magnetic field, and discharging the resulting combustion products.

29. Combustion generated plasma propulsion means comprising, in combination, a housing having a combustion chamber therein and an exhaust end portion in fluid communication with said combustion chamber to receive and discharge exhaust gases therefrom, fuel supply means operatively connected to said combustion chamber to provide fuel thereto for combustion therein, means mounted and positioned relative to said combustion chamber and to said exhaust portion of said propulsion means to provide a fluid to same and spirally direct said fluid onto exhaust gases resulting from combustion of fuel in said combustion chamber and cause constriction of the exhaust gases in said combustion chamber, and magnetic means mounted relative to said exhaust portion of said combustion chamber and positioned around exhaust gases passing therethrough to in operation cause further constriction of exhaust gases passing therethrough.

References Cited by the Examiner

UNITED STATES PATENTS

| | | |
|---|---|---|
| Re. 25,088 | 11/1961 | Ducati et al. |
| 2,718,757 | 9/1955 | Bloomer et al. _____ 60—39.65 |
| 2,807,137 | 9/1957 | Meulien et al. _____ 60—35.54 |
| 2,944,623 | 7/1960 | Bodine. |
| 3,030,769 | 4/1962 | Badders _____ 60—35.6 |
| 3,041,824 | 7/1962 | Berhman. |

OTHER REFERENCES

Giannini, G. N., "The Plasma Jet," Scientific American, pages 80–86, August 1957.

MARK NEWMAN, *Primary Examiner.*

SAMUEL LEVINE, *Examiner.*

D. HART, *Assistant Examiner.*